US012260192B2

(12) United States Patent
Scolnick et al.

(10) Patent No.: US 12,260,192 B2
(45) Date of Patent: Mar. 25, 2025

(54) WORKFLOW APPLICATION AND USER INTERFACE BUILDER INTEGRATING OBJECTS, RELATIONSHIPS, AND ACTIONS

(71) Applicant: Palantir Technologies Inc., Denver, CO (US)

(72) Inventors: Myles Scolnick, New York, NY (US); Bianca Rahill-Marier, London (GB); Xinyi Wang, New York, NY (US); Sarah Beckoff, Jerusalem (IL); Quentin Le Pape, London (GB); Shaun Springer, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/321,595

(22) Filed: May 22, 2023

(65) Prior Publication Data

US 2023/0289153 A1    Sep. 14, 2023

Related U.S. Application Data

(63) Continuation of application No. 18/046,679, filed on Oct. 14, 2022, now Pat. No. 11,704,098, which is a
(Continued)

(51) Int. Cl.
*G06F 3/0482* (2013.01)
*G06F 8/38* (2018.01)
*G06F 40/186* (2020.01)

(52) U.S. Cl.
CPC .............. *G06F 8/38* (2013.01); *G06F 3/0482* (2013.01); *G06F 40/186* (2020.01)

(58) Field of Classification Search
CPC ................................................ G06F 3/048–05
See application file for complete search history.

(56) References Cited

U.S. PATENT DOCUMENTS

| 5,483,654 A * | 1/1996 | Staron ............. G06F 9/451 715/804 |
| 7,581,011 B2 * | 8/2009 | Teng ................. H04L 63/0823 709/229 |

(Continued)

FOREIGN PATENT DOCUMENTS

EP    3822886    5/2021

OTHER PUBLICATIONS

Cicortas et al., "Considerations on the Roles and Ontology in Modeling Workflow Management Systems", IEEE 2020 International Joint Conference on Computational Cybernetics and Technical Informatics (ICCC-CONTI), May 27, 2010, pp. 613-618.
(Continued)

*Primary Examiner* — Daniel Rodriguez
(74) *Attorney, Agent, or Firm* — Knobbe, Martens, Olson & Bear, LLP

(57) ABSTRACT

Systems, techniques, and user interfaces are disclosed for an object-centric builder software that can utilize an ontology to design, configure, and build a workflow application that also references the ontology to perform a workflow. The ontology may serve as a data model for stored data associated with the particular workflow. The builder software may leverage the ontology to obtain advance knowledge of the availability and structure of the stored data that will be accessible to the workflow application at run-time, in order to build a workflow application that is well-tailored for that particular workflow. This approach may also result in flexible workflow applications that are easily built and maintained.

20 Claims, 11 Drawing Sheets

Related U.S. Application Data continuation of application No. 17/368,615, filed on Jul. 6, 2021, now Pat. No. 11,500,620, which is a continuation of application No. 16/730,073, filed on Dec. 30, 2019, now Pat. No. 11,086,602.

(60) Provisional application No. 62/934,896, filed on Nov. 13, 2019.

(56) References Cited

U.S. PATENT DOCUMENTS

| | | | | |
|---|---|---|---|---|
| 7,971,186 B1* | 6/2011 | Peyton | | G06F 8/34 717/109 |
| 10,165,118 B1* | 12/2018 | Agarwal | | H04M 3/493 |
| 11,086,602 B2 | 8/2021 | Scolnick et al. | | |
| 11,500,620 B2 | 11/2022 | Scolnick et al. | | |
| 11,704,098 B2 | 7/2023 | Scolnick et al. | | |
| 2002/0184610 A1* | 12/2002 | Chong | | G06F 8/20 717/109 |
| 2003/0117436 A1* | 6/2003 | Kautto-Koivula | | G06F 3/0481 715/762 |
| 2006/0070025 A1* | 3/2006 | Mauceri, Jr. | | G06F 8/30 717/110 |
| 2006/0236304 A1 | 10/2006 | Luo et al. | | |
| 2007/0027894 A1* | 2/2007 | Bridges | | G06Q 10/00 707/999.102 |
| 2007/0157088 A1* | 7/2007 | Lewis-Bowen | | G06Q 10/06 715/700 |
| 2008/0147453 A1* | 6/2008 | Kogan | | G06Q 10/06 705/7.26 |
| 2008/0209078 A1* | 8/2008 | Bates | | G06Q 10/00 710/10 |
| 2009/0083408 A1* | 3/2009 | Hecht | | G06Q 10/10 709/223 |
| 2014/0229898 A1* | 8/2014 | Terwedo | | G06F 3/04842 715/835 |
| 2014/0279979 A1* | 9/2014 | Yost | | G06F 16/219 707/798 |
| 2014/0282177 A1* | 9/2014 | Wang | | G16B 50/00 715/771 |
| 2015/0067687 A1* | 3/2015 | Turner | | G06F 3/0484 718/102 |
| 2015/0113451 A1* | 4/2015 | Kopp | | G06F 16/242 715/764 |
| 2015/0170088 A1* | 6/2015 | Rizk | | G06Q 10/06316 705/7.26 |
| 2015/0186132 A1* | 7/2015 | Oliveri | | G06F 8/34 717/120 |
| 2015/0350443 A1* | 12/2015 | Kumar | | G06F 3/04842 379/265.13 |
| 2016/0259534 A1* | 9/2016 | Simons | | G06F 3/0482 |
| 2016/0275122 A1* | 9/2016 | Kara | | G06F 16/248 |
| 2017/0075333 A1* | 3/2017 | Norman | | G06F 9/4881 |
| 2017/0147190 A1* | 5/2017 | Twist | | G06F 3/0481 |
| 2017/0161347 A1* | 6/2017 | Raza | | H04L 67/01 |
| 2017/0235717 A1* | 8/2017 | Kumar | | G06F 16/367 704/9 |
| 2017/0236067 A1* | 8/2017 | Tjiong | | G05B 23/0229 706/11 |
| 2017/0316355 A1* | 11/2017 | Shrestha | | G06Q 10/067 |
| 2017/0329506 A1* | 11/2017 | Laetham | | G06F 9/451 |
| 2017/0371504 A1* | 12/2017 | Sharma | | G06F 9/451 |
| 2019/0042068 A1* | 2/2019 | Tompkins | | G06F 16/252 |
| 2019/0102069 A1* | 4/2019 | Strinden | | G06F 3/0484 |
| 2020/0394688 A1* | 12/2020 | Loflin | | G06F 3/0483 |

OTHER PUBLICATIONS

Dillon, A. "User interface design", MacMillan Encyclopedia of Cognitive Science, vol. 4, London: MacMillan, 2003, pp. 153-458.

Koers, "How to align excel 2010 data horizontally and vertically", available at https://www.dummies.com/software/microsoft-office/excel/how-to-align-excel-2010-data-horizontally-and-vertically, archived on Sep. 2, 2016 at wayback machine: http://web.archive.org, 4 pages (2016).

Official Communication for European Patent Application No. 20207175.9 dated Aug. 3, 2021, 10 pages.

* cited by examiner

FIG. 9

WORKFLOW APPLICATION AND USER INTERFACE BUILDER INTEGRATING OBJECTS, RELATIONSHIPS, AND ACTIONS

INCORPORATION BY REFERENCE TO ANY PRIORITY APPLICATIONS

This application is a continuation of U.S. patent application Ser. No. 18/046,679, entitled "WORKFLOW APPLICATION AND USER INTERFACE BUILDER INTEGRATING OBJECTS, RELATIONSHIPS, AND ACTIONS," filed Oct. 14, 2022, which is a continuation of U.S. patent application Ser. No. 17/368,615, entitled "WORKFLOW APPLICATION AND USER INTERFACE BUILDER INTEGRATING OBJECTS, RELATIONSHIPS, AND ACTIONS," filed Jul. 6, 2021, which is a continuation of U.S. patent application Ser. No. 16/730,073, entitled "WORKFLOW APPLICATION AND USER INTERFACE BUILDER INTEGRATING OBJECTS, RELATIONSHIPS, AND ACTIONS", filed Dec. 30, 2019, now issued as U.S. Pat. No. 11,086,602, which claims benefit of U.S. Provisional Application No. 62/934,896, entitled "OPERATIONAL APPLICATION AND USER INTERFACE BUILDER INTEGRATING OBJECTS, RELATIONSHIPS, AND ACTIONS," which was filed Nov. 13, 2019. Each of these applications are hereby incorporated by reference herein in their entireties.

Any and all applications for which a foreign or domestic priority claim is identified in the Application Data Sheet as filed with the present application are hereby incorporated by reference under 37 CFR 1.57.

TECHNICAL FIELD

The present disclosure relates to software for building a workflow application used to execute the workflow logic associated with a workflow. More specifically, the present disclosure relates to an object-centric builder software for designing, configuring, and building a workflow application using a data foundation shared with the workflow application.

BACKGROUND

Many entities (e.g., companies) utilize workflow applications for managing, viewing, and manipulating data associated with a workflow of those entities, thereby allowing workflow logic to be carried out through application logic. As an example, an employee working for a taxi company may be tasked with dispatching taxis to pick up customers based on a set of criteria, and the taxi company may utilize a workflow application that enables the employee to view data and perform functions associated with dispatching taxis through a comprehensive dashboard user interface of the workflow application.

There currently exists various ways that these workflow applications can be built. In some instances, a workflow application can be built from scratch that is highly-customized to fit the needs of the entity. The resulting workflow application may provide a very positive user experience due to the high degree of customization possible. However, this approach may be expensive and require a high level of technical expertise. Additionally, it may take a very long time to build a workflow application from the ground up, and the resulting workflow application may be associated with high ongoing maintenance costs because there will be no out-of-the-box way to maintain the workflow application over time, or make changes to the workflow application as the needs of the entity change. These drawbacks may be especially problematic when building and maintaining numerous different workflow applications for multiple different entities, a situation that could be made more-efficient if previous efforts could be taken advantage of.

An alternative approach to building workflow applications involves the use of builder software that may be specifically designed for the purpose of building and customizing workflow applications and their associated user interfaces. This software may make it simpler, faster, and easier to build customized workflow applications that are tailored towards addressing a workflow of an entity. This approach may allow for the workflow application to be built quickly and with a lower level of technical expertise, and it may be well-suited for the task of building numerous workflow applications for multiple different entities. However, this approach may be less flexible because any customizations would have to be pre-defined within the builder software. There may be tremendous variety among the workflows of different entities, and also variety among the structure and relationships for the data relied upon by each of the different entities, which can make it difficult to generate highly-customized workflow applications while retaining ease-of-use of the builder software. Accordingly, resulting workflow applications may have non-optimal user experience and quality.

SUMMARY

The systems, methods, and devices described herein each have several aspects, no single one of which is solely responsible for its desirable attributes. Without limiting the scope of this disclosure, several non-limiting features will now be discussed briefly.

The present disclosure is directed to systems, techniques, and user interfaces associated with builder software that can utilize an ontology to design, configure, and build workflow applications that also utilize the ontology. In other words, the present disclosure is directed to the use of an ontology that is integrated with both the builder software (e.g., for building and customizing workflow applications) and the workflow application it generates.

The ontology may serve as a data model for stored data associated with a particular workflow and/or entity. For instance, the ontology may define the data object types, the relationships between data object types, and the actions associated with data object types, that exists within that stored data. In some cases, the ontology may define the permissions associated with data object types and actions as well. The builder software may leverage the ontology to enable an application creator to build out a workflow application that is tailored for that particular workflow, since the ontology will provide the builder software with advance knowledge of the availability and structure of the stored data that will be accessible to the workflow application at run-time. The workflow application may also leverage the ontology at run-time, not only to make sense of the stored data, but also to adhere to its configuration imposed by the builder software.

This approach towards building workflow applications allows for powerful and flexible workflow applications that are: (1) easily built and maintained; (2) capable of providing a positive user experience; and (3) well-tailored to address a workflow of any particular entity.

According to some aspects of the disclosure, the builder software may allow for the customization and configuration of various aspects of a workflow application, including the workflow logic and the user interface of the workflow application. The builder software may have a user interface configured to provide a preview of the user interface of the generated workflow application. The user interface of the workflow application may include numerous modular user interface elements (referred to as "widgets"), and default (e.g., out-of-the-box) and/or custom widgets may be individually added to the workflow application and configured through the builder software. These widgets may be used in the workflow application to view, interact, or modify data. Multiple widgets may be configured to pass data among one another and linked to form a widget group.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458). The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of resource dependency, or data transformation, relationships and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Contemplated herein are various computer-implemented methods, non-transitory computer-readable media implementing said computer-implemented methods, and computing systems implementing said computer-implemented methods. In particular, the non-transitory computer readable media may include computer-executable instructions that, when executed by a computing system, cause the computing system to perform operations of one of the contemplated computer-implemented methods. Additionally, a computing system may include a computer readable storage medium having program instructions embodied therewith; and one or more processors configured to execute the program instructions to cause the computing system to perform one of the contemplated computer-implemented methods.

In various embodiments, the contemplated computer-implemented method may include accessing an ontology that defines: a set of data object types; relationships among the data object types; properties associated with the data object types; and actions associated with the data object types. The method may further include displaying an interactively-configurable layout of a workflow user interface to a user, wherein the interactively-configurable layout serves as a template for the workflow user interface of a workflow application; adding an interactively-configurable component to the interactively-configurable layout, wherein the interactively-configurable component serves as a template for a component in the workflow user interface of the workflow application; configuring the interactively-configurable component with a configuration based at least in part on the ontology, wherein the configuration specifies a performance of an action that the ontology defines is associated with a first data object type; and generating the workflow application having the workflow user interface and the component based on the interactively-configurable layout and the interactively-configurable component, wherein the component is configured to perform a part of a workflow on a set of data objects based on the configuration of the interactively-configurable component.

In some embodiments, the interactively-configurable component is selected from a set of components, wherein the set of components includes a filter list, a table, or a button. In some embodiments, the configuration of the interactively-configurable component includes an input data object set, an output data object set, or a set of actions associated with a data object type. In some embodiments, the configuration of the interactively-configurable component includes an input data object set, an output data object set, or a set of actions associated with a data object type. In some embodiments, the interactively-configurable component is a first interactively-configurable component, the component is a first component, and the method further includes: adding a second interactively-configurable component to the interactively-configurable layout, wherein the second interactively-configurable component serves as a template for a second component in the workflow user interface of the workflow application; and configuring an output from the first interactively-configurable component to be an input of the second interactively-configurable component to link the second component to the first component in the workflow application.

In some embodiments, the ontology includes definitions for a set of actions associated with a data object type, wherein the set of actions includes an action for changing a property value of a data object of the data object type. In some embodiments, the interactively-configurable component is added to a container of the interactively-configurable layout, and the interactively-configurable component is aligned on the left, right, or top of the container. In some embodiments, the interactively-configurable component is configured to perform actions on properties of the set of data objects. In some embodiments, the interactively-configurable component is configured to execute a user-defined function on an input that corresponds to an input type of the user-defined function. In some embodiments, the interactively-configurable component is configured to execute a user-defined function stored separately from the workflow application. In some embodiments, the interactively-configurable component is imported into the interactively-configurable layout in a custom component plugin as part of a plugin architecture.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 9 illustrates an example user interface of an object-centric builder software for customizing a widget added to a container of a workflow application, according to various embodiments of the present disclosure.

DETAILED DESCRIPTION

Overview

Figure 1:
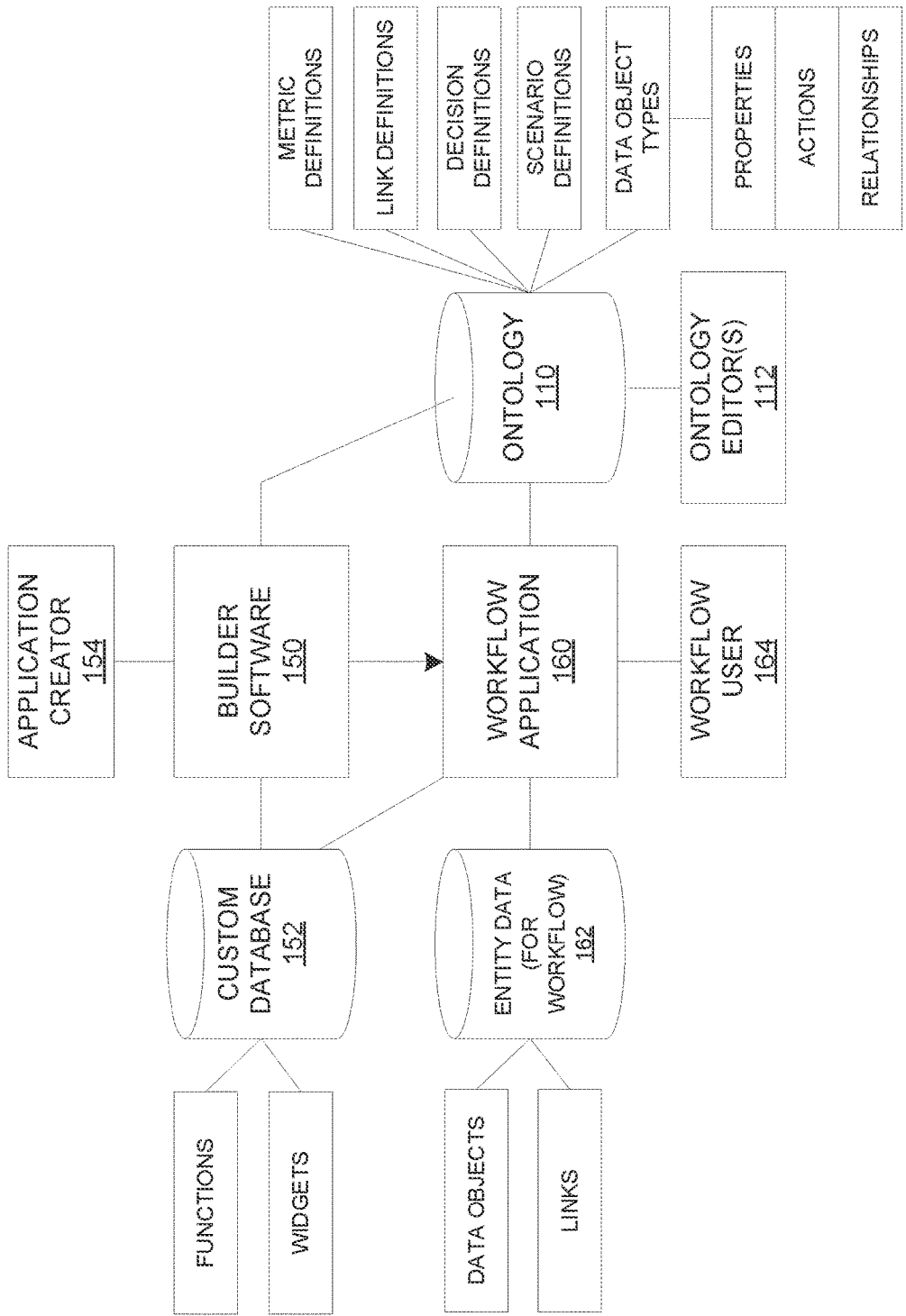
FIG. 1 illustrates a block diagram of an object-centric application-building system, according to various embodiments of the present disclosure.

Many entities (e.g., companies) utilize workflow applications for managing, viewing, and manipulating data associated with a workflow of those entities, thereby allowing workflow logic to be carried out through application logic. As an example, an employee working for a taxi company may be tasked with dispatching taxis to pick up customers based on a set of criteria, and the taxi company may utilize a workflow application that enables the employee to view data and perform functions associated with dispatching taxis through a comprehensive dashboard user interface of the workflow application.

There currently exists various ways that these workflow applications can be built. In some instances, a workflow application can be built from scratch that is highly-customized to fit the needs of the entity using the workflow application. The resulting workflow application may provide a very positive user experience due to the high degree of customization possible. However, this approach may be expensive and require a high level of technical expertise. Additionally, it may take a very long time to build a workflow application from the ground up, and the resulting workflow application may be associated with high ongoing maintenance costs because there will be no out-of-the-box way to maintain the workflow application over time, or make changes to the workflow application as the needs of the entity change. These drawbacks may be especially problematic when building and maintaining numerous different workflow applications for multiple different entities, a situation that could be made more-efficient if previous efforts could be taken advantage of.

An alternative approach to building workflow applications involves the use of builder software that may be specifically designed for the purpose of building and customizing workflow applications and their associated user interfaces. This software may make it simpler, faster, and easier to build customized workflow applications that are tailored towards addressing a workflow of an entity. This approach may allow for the workflow application to be built quickly and with a lower level of technical expertise, and it may be well-suited for the task of building numerous workflow applications for multiple different entities.

However, there are many limitations associated with workflow applications developed and configured using existing builder software, which can affect both the experience of the workflow users using those workflow applications and the application creators using the builder software. For instance, there may be tremendous variety among the workflows of different entities (and the structure and relationships for the data relied upon by each of those different entities), which makes it difficult to generate highly-customized workflow applications while retaining ease-of-use of the builder software (e.g., due to a trade-off between power and ease-of-use for the builder software). Any customizations for the workflow applications have to be pre-defined in existing builder software, which increases the difficulty of using the builder software. As a result, workflow applications created from existing builder software may lack flexibility and customization. In particular, these workflow applications may have limited customizations or tailored for a particular workflow they were meant to address. Certain workflows may have special needs (e.g., cross-filtering) that require certain user interface elements to carry out, which may not be available or difficult to include in the workflow application.

Another limitation of workflow applications developed and configured using existing builder software is that the workflow applications may lack specificity (e.g., the "blank-canvas" problem) and have too many general capabilities. For instance, these workflow applications may lack the necessary features (e.g., write-back) to serve as the system of record. They may also lack interactive, customizable user interface elements designed to enable users to carry out or execute portions or aspects of the workflow. For instance, the workflow application may focus on reading and displaying data over writing data, often by providing a singular display of data (e.g., a filterable view of data objects), but without providing additional ways to interact with that data—unless additional plug-ins are used or the workflow user switches between multiple user interfaces (e.g., to string together various views in different interfaces). For the latter option, discoverability may be difficult and the workflow user may find it difficult to find a specific user interface (e.g., as they are switching between multiple user interfaces). These issues may result in low application quality and non-optimal user experience.

Another limitation of those workflow applications developed and configured using existing builder software may be that workflows are an implicit, rather than explicit, focus of these workflow applications. Such workflow applications may allow for too much data openness (e.g., all workflow users are able to see everything they are allowed to see in the data through the workflow application). Paradoxically, this lack of focus means that, despite being provided open data access, a workflow user of such workflow applications may find it difficult to find the specific data they need to accomplish a workflow goal or answer a particular question.

Another limitation of workflow applications developed and configured using existing builder software is that they can be difficult and time consuming to build, modify, and maintain over time. The workflow logic (e.g., capturing the workflow) is directly programmed into the application logic of the workflow application via the builder software. This makes it difficult to debug, update, and maintain the workflow applications over time, especially as the underlying workflow logic changes.

Aspects of the present disclosure address the above limitations and more by utilizing an ontology that is integrated with both the builder software (e.g., for building and customizing workflow applications) and the workflow application it generates. The ontology may include definitions (e.g., defining data object types, properties, relationships, actions, and so forth) for modeling a view on real-world objects associated with a workflow and permissions associated with any of those definitions (e.g., permissions for data object types, actions, and so forth). The ontology can also be applied as a data model to stored data associated with a particular workflow and/or entity (e.g., entity data). For instance, the definitions in the ontology can be used to determine all the data objects (e.g., of a defined data object type) that exist in the stored data, along with any relationships between data objects, the actions associated with each data object, and so forth.

Integrating the ontology with the builder software and the workflow application allows both the builder software and the workflow application to be data-objects-aware. The builder software may leverage the ontology to enable an application creator to build out a workflow application that is better tailored for that particular workflow, since the ontology will provide the builder software with advance knowledge of the availability and structure of the stored data that will be accessible to the workflow application at run-time. The workflow application may also leverage the ontology at run-time, not only to make sense of the stored data, but also to adhere to its configuration imposed by the builder software. The ontology enables workflow users of the workflow application to operate on data in familiar terms (e.g., data objects structured based on their associated data object type) and benefit from pre-defined links in the ontology (e.g., relationships defined between different data object types). Thus, utilizing a builder software that harnesses an ontology may allow for the creation of more powerful and flexible workflow applications. The builder software and workflow applications disclosed herein, which leverage and integrate the ontology in this manner, may be referred to as "object-centric" (e.g., an object-centric builder software) in reference to the data model of the ontology.

In various implementations, the object-centric builder software disclosed herein may allow for the addition, removal, and configuration of modular user interface elements (referred to as "widgets") for the workflow application. Widgets may provide ways for a workflow user of the workflow application to view data (e.g., a data object or set of data objects), interact with data, or perform write-back on data (via "actions", to provide better re-usability of workflow logic across workflow applications and better control of the quality of the underlying data). In various implementations, the object-centric builder software may provide various widgets out-of-the-box (e.g., a set of various default widgets) that can be added to a workflow application. In various implementations, the object-centric builder software may also provide a way for application creators to add custom widgets beyond those provided by default. For instance, the builder software may have plug-in functionality for extending the kinds of widgets that can be added to the workflow application, and custom widgets can be authored in a custom plugin that can be imported for implementation.

In various implementations, the object-centric builder software may reference the ontology for the configuration of the widgets that will be included in the workflow application. For instance, inputs, outputs, parameters, and constraints of a widget may be set by the application creator based on the definitions in the data model provided by the ontology. Furthermore, multiple widgets may be linked or strung together (e.g., configured to communicate or pass data between one another, such as by having the output of one widget serve as the input of another widget). By adding and configuring widgets, an application creator can customize the generated workflow application to contextualize data for a workflow through interactive widgets, visualizations, and intuitive write-back. The object-centric builder software can validate widget configurations against the definitions in the ontology (e.g., the inputs and outputs of a widgets may be configured to adhere to specific data object types) in order to ensure that the widgets will work properly and without error in the built workflow application due to their shared data foundation.

As an example, an ontology may define a "taxi" data object type, which has a Boolean property of "status" (e.g., that can take on values of "vacant" or "occupied"), an action called "status change" to toggle the Boolean property (e.g., between "vacant" or "occupied"), and a property of "city" (e.g., the name of a city). Thus, entity data for a taxi company may comprise a set of "taxi" data objects, each of which may include properties and actions indicated by the ontology (but each having property values associated with the respective data objects). The builder software can be used to add and configure a first and second widget based on these ontology definitions. For instance, the first widget may display an array of user-selectable filters associated with the properties of "taxi" data objects, and it may further be configured to take as an input a set of all the "taxi" data objects in the entity data (e.g., which may represent all the taxis in operation) and output a list only the "taxi" data objects that have the property values that match the array of user-selectable filters. For instance, the user may select filters to include only "taxi" data objects having the value "vacant" for the "status" property and having the value "new york city" for the "city" property. The first widget will generate as an output a set of all taxi data objects that are "vacant" and located in "new york city." The second widget may include a button configured to use the output of the first widget as its input and perform the "status change" action as defined in the ontology. Thus, clicking the button of the second widget would take all the taxi data objects that are "vacant" in "new york city" and switch their "status" property to "occupied."

In various implementations, workflow logic (e.g., for a workflow) may be included in the workflow application in order to enhance a workflow user's comprehension of the data (e.g., deriving properties to rank data objects) or to suggest further actions based on user interactions with the workflow application (e.g., suggest modifications that can be made to a user's selection of data objects). In various implementations, the workflow logic may be included or integrated into a workflow application in different ways. In some cases, workflow logic may be integrated through frontend configuration of the workflow application in the builder software (e.g., by configuring a widget to filter for a dynamic set of data objects). In some cases, workflow logic can be written into functions that respond in real-time to user inputs. Using functions (which can be separately stored from the workflow application and ontology) to capture workflow logic may allow the workflow logic to be shared and re-usable, rather than sequestered inside a single workflow application. In these approaches, storing the workflow logic separately from the workflow application itself while having the workflow application import the workflow logic (e.g., as a function or plugin) may simplify maintenance of the workflow application. For example, even if the workflow logic changes, the workflow application would not have to be changed. The workflow logic itself can be modified and the workflow application would simply continue to apply the workflow logic (now updated).

There may be numerous additional benefits associated with the object-centric builder software and workflow application, which integrate the ontology in the manner described herein. In particular, this approach results in a shared data foundation between the builder software and workflow application, which lowers the technical bar required for an application creator to build workflow applications and interactive widgets for multiple different entities and user groups. In particular, since a workflow application is built out of widgets (e.g., modular components) that are wired together, and the widgets themselves are individually configured using relevant ontology information (e.g., constraints on data object types for inputs), the workflow application is much easier to build and maintain due to the lower complexity involved. The amount of available functionality in the workflow application should also increase over time because that functionality will be proportional to the number of available widgets to select from in the builder software (which should increase over time as new default or custom widgets are created and added). Furthermore, since the configuration is constrained to the available types of widgets and their inputs/outputs, the features available through a particular widget can be improved while maintaining the same inputs/outputs. In such a case, there would be no additional work required for the application creator and a better workflow application would develop over time.

In other words, the resulting workflow application may be dynamic (e.g., due to the ease of configuring the workflow application or extending its functionality through plug-ins) while also remaining specific to the needs of the workflow and its associated entity (e.g., as if the workflow application was custom designed from the ground up specifically for that workflow). More specifically, the workflow application may be configured to present data to users in a way (e.g., what data is shown, how the data is shown, which users are shown the data, and so forth) that is specific to the workflow and the problem at hand. The resulting workflow application may be more valuable because, in addition to being specific to the workflow and the problem at hand, it may be trusted and relevant. The resulting workflow application may also provide compounding value (e.g., non-linear benefits), delivered by the universality of the underlying ontology, which means that actions taken by a user may affect the view of the world (e.g., the data objects) presented to other users. In the future, these non-linear benefits may be increased via closed learning loops within the platform.

The object-centric builder software contemplated herein may address a large range of application-building needs and allow for exceptional workflow applications to be developed that improve the experience of workflow users. It may also allow the workflow application building process to be captured into a single experience, enabling application creators to publish stand-alone workflow applications having user interfaces tailored to specific workflows. The object-centric builder software may be seamlessly integrated with the ontology, which not only makes it easier for an application creator to build a workflow application, but also makes it easier for a workflow user to understand the widgets presented to them in the of the workflow application.

This approach also scales well with workflow complexity (e.g., it can be used to create workflow applications to execute on workflows of varying complexity) and maximizes custom widget reusability (e.g., a custom widget can be defined in an added plug-in, which can be shared and reused for different workflow applications). This approach benefits application creators by providing a flexible workflow application-building toolkit with highly-customizable out-of-the-box widgets that can be added to many different workflow applications, which improves the long-term maintainability of the workflow applications by reducing the need for creating completely custom widgets for every workflow application (although the ability to add a custom widget is still there and preserved through the use of plug-ins). This approach also benefits workflow users of the workflow application, since the workflow application may be configured to provide contextualized data useful for navigating, exploring, and understanding the data objects in the stored data. The workflow application may provide a user interface that is contextualized to a particular workflow, which enables it to be intuitively navigated to deliver a cohesive user experience. Additionally, this approach allows for a generated workflow application to track the provenance of data objects, actions, and workflow logic (e.g., functions) used in the workflow application, so over time as the ontology and workflow logic changes, the application creators can be informed of the updates that have been made and any other workflow applications that may be affected by those updates.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Source: A location from which data comes. It can be a file, a particular database on a database management system (DBMS), a live data feed, a server, and so forth. A data store or a database may be examples of a data source.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Ontology: Stored information that provides a data model for storage of data in one or more databases. For example, the stored data may comprise definitions for data object types and respective associated property types. An ontology may also include respective link types/definitions associated with data object types, which may include indications of how data object types may be related to one another. An ontology may also include respective actions associated with data object types or relationships between data object types. The actions associated with data object types may include, e.g., defined changes to values of properties based on various inputs. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types. An ontology may also provide a permissions model for stored data and it may include permissions associated with any of the definitions in the ontology (e.g., permissions for data object types, actions, and so forth).

Object: A real-world asset, entity, region, event, or phenomena for which data exists or for which data may be expected to exist within the context of a workflow application. Objects may be classified under, associated with, or belong to, one or more object types. An object may be an instance of an object type it is associated with. For example, "Car A" and "Car B" may be two different objects that both have a Car object type. However, is important to note that the term object can extend beyond its common usage towards referencing physical assets (e.g., individual vehicles or mechanical parts), and may be used to refer to anything that can be discretely defined, such as entities (e.g., an organization, a party, a person, a user, a market instrument, a document, or other noun), geographical regions, events, key performance indicators (KPIs), and so forth.

Data Object: A data container (e.g., grouping of data) for information representative of, or associated with, an object in the real-world that has a number of definable properties. The data object may be organized under a data construct or data structure defined in the ontology. Each data object may be associated with a unique identifier that uniquely identifies the data object. A data object may have one or more properties, which may correspond to actual attributes of the object the data object corresponds to. A data object may serve as a data-based representation, abstraction, or model of the actual object it corresponds to. Although a data object may often be referred to using a similar name or identifier as the object it is associated with, the data object is not to be confused with the object itself. For instance, the object "Car A" may be a particular automobile and a particular set of data may include data that pertains to that automobile, such as the car's model, make, year, paint color, and so forth. This data may be grouped together as the various properties of a "Car A" data object, which is an abstraction of the actual "Car A" in reality. A data object may be implicit (e.g., it inherently exists because data associated with the corresponding object exists among the raw/entity data) or it may be explicit (e.g., the data object has been defined by users of a platform). A data object may be classified under, associated with, or belong to, one or more data object types. For example, the "Car A" data object may be of a "Car" data object type.

Data Object Type: A data object type may be a type for a data object (e.g., person, event, document, and so forth) and data object types may be defined in the ontology to provide a structure or serve as a data model for the data objects associated with that particular data object type (e.g., a data object may inherit one or more aspects of the data object type it belongs to). The structure of a data object type may be user-definable. The various definable aspects of a data object type may include properties (and possibly the range or types of permissible values for those properties), permissions, actions, relationships or interactions (e.g., with other data object types, which may govern relationships or interactions between data objects of those data object types), and so forth. These definitions may then be applied to data objects of that data object type (e.g., a data object will have values for the properties that were defined for its data object type). For example, a "Car" data object type may be defined to include model, make, year, paint color as properties, and a "Car A" data object would include values for those properties. Available data object types (e.g., defined in an ontology) may vary depending on workflows of an entity and the data objects within the raw/entity data that is used in the workflows.

Properties: Attributes of a data object that represent individual data items. At a minimum, each property of a data object has a property type and a value or values. The properties associated with a data object may be defined through a data object type (corresponding to that data object) in the ontology.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Workflow: A set of workflow logic and actions taken together in order to satisfy an operational goal or need. Depending on the workflow, a portion or the entirety of that workflow may be executed or carried out through application logic (e.g., by a workflow user interacting with a user interface of a workflow application). In some cases, a workflow may cross multiple workflow applications (e.g., a first portion of a workflow may be executed on through a first workflow application and a second portion of the workflow may be executed on through a second workflow application).

Workflow Application: A software application that allows for managing, viewing, and manipulating data associated with a workflow. The workflow application may contextualize data for a workflow by providing to its workflow users various views on the data and also providing a starting point for decision-making based on the displayed data. Workflow applications are often entity-specific (e.g., tailored for a workflow associated with a particular entity). For embodiments of workflow applications described herein, the workflow application may use data objects as its primary backing source, but it may also utilize workflow logic or related visualizations from external sources embedded within it. For embodiments of workflow applications described herein, the workflow application may adhere to some major constraints (e.g., it can only read/write to data objects) and there may be certain benefits for doing so (e.g., built-in interaction model with other workflow applications).

Widget (may also be referred to as a component, depending on context): A modular component in a user interface (e.g., a user interface element), which may be added or removed from the user interface. A widget may contextualize data objects for a specific workflow, and provide a user a way to view data (e.g., a data object or set of data objects), interact with data, or perform write-back ("actions") on data. There can be many widgets in a single user interface. For instance, a user interface of a workflow application may include multiple widgets, which may be added, removed, and configured through a builder software. The builder software may provide, out of the box, various widgets that can be included in a workflow application. Some examples of widget types for visualizing data objects may include tables, histograms, charts, mini data object views, and data object summary cards. Some examples of widget types for interacting with data may include filters, inputs, sliders, checkboxes, switches, and tabs. A widget may have a title, strongly typed configuration, a way to render itself, and other things such as descriptions (e.g., of selection or filters). A widget may have an input configuration and publish outputs. Variables may be mapped to inputs and outputs can be of any allowed variable type. Different widgets may be configured to indirectly interact with one another through these variables. In other words, widgets in the user interface may be able to communicate with one another (e.g., to pass data objects between one another, open a widget from another widget, and so forth) and may be configured to do so via the builder software by pre-filling external configuration parameters (e.g., for variables). When multiple widgets are linked together for the specific purpose of enabling a user to execute a particular workflow that overall combination of widgets may be referred to as a widget group.

In some implementations, the builder software may also allow for additional plug-ins for the creation and use of custom widgets. In some implementations, some custom widgets may be designed specifically for use with a particular workflow or entity. Some widgets may be used to allow users of the workflow application to configure, or view the results of, decisions or scenarios. For instance, a widget may be used to display metrics generated by a decision. A "view" widget may be an example of a widget that can be used to display various kinds of data to a workflow user, such as data objects in a data object view widget. A widget may use data objects as a primary backing source (e.g., inputs), but it may also take in workflow logic or related visualizations from external sources. In some implementations, some widgets may have constraints that are configured and imposed by the application creator. In some implementations, the builder software may be able to determine or infer functionality of these widgets (e.g., components) based on various conditions, such as available actions, properties, or permissions, with the conditions based on the definitions in the ontology. For instance, during the configuration of a widget that has already been configured to use a set of data objects as an input, the builder software may present available actions that can be performed by the widget based on the actions available to the set of data objects (e.g., the actions for the data object type of the set of data objects, as defined in the ontology).

Layout: A design for a user interface of a workflow application that is configured through the builder software. A layout may be designed with a particular workflow and/or widget group (e.g., combination of widgets) in mind, and the layout specifies the arrangements, positions, and dimensions of the various widgets in the user interface.

Widget Group: A collection or combination of specifically configured widgets that are linked or strung together (e.g., for a particular workflow). The widget group may be presented in a user interface of a workflow application, and it may enable a workflow user of the workflow application to execute a portion or the entirety of a workflow that the widget group is specifically tailored for.

Workflow User: Someone whose primary goals and responsibilities are directly related to those of an entity (e.g., an entity goal or need), who may utilize a workflow application to execute or perform various aspects of a workflow used by the entity. This is in contrast to someone whose primary responsibility is data integration, data management, or other technical support functions. A workflow user may exist at all levels of hierarchy within an entity (e.g., executive to front-office, etc.) and at different levels of technical competency (a trader developing forecasting models, a petroleum engineer, a sales manager, a maintenance technician, etc.). As used herein, the term user, by itself, may refer to a workflow user depending on the intent and context surrounding the use of that term.

Builder Software: A software application that allows for designing, customizing, and creating workflow applications. Through the builder software, an application creator may be able to configure the layout of the workflow application. The builder software may also allow an application creator to add workflow logic associated with the workflow, either via frontend configuration or using programmatically-defined functions that responds in real-time to user inputs. For embodiments of the builder software described herein, in which the builder software shares a data foundation (e.g., the ontology) with the workflow application being created, the builder software may lower the technical bar required to build interactive workflow applications. Furthermore, the builder software may allow a workflow application to be built in a manner that scales well with workflow complexity, allows for custom widget reusability, and improves long-term maintainability of the workflow application.

Application Creator: Someone who creates a workflow application, such as by utilizing builder software to generate and configure the workflow application, including the user interfaces, widget groups, and widgets that will be presented to an operational user. Decision: A set of changes and/or logic applied to one or more data objects in order to capture or reflect an action (e.g., taken as a part of the overall workflow). A decision may be user-defined. A decision may include definitions of one or more input data object types (e.g., selected among data object types defined by an ontology), such that the decision only operates on data objects of the input data object type(s). A decision may include definitions of its output, such as one or more output data object types (e.g., selected among data object types defined by the ontology). A decision may apply a set of logic to one or more data objects (e.g., inputs) to generate one or more data objects. A decision may apply a set of logic to one or more data objects (e.g., inputs) to generate one or more metrics, which may be derived from property values of the input data objects. A decision may include one or more constraints (e.g., pieces of logic) that prevents a set of changes from being applied in a particular situation or flag any prohibited operations. For instance, a constraint may be a validation check that flags when a user is proposing a prohibited operation by validating the output of the decision (alternatively or in addition, the operation could be prohibited based on the privileges of the user, e.g., a user not in the "manager" user-group cannot change a particular value by more than 10%), if executed (e.g., such as if property values for the input data objects would be changed to a greater value than permitted). A decision may be associated with a decision status (e.g., scenario, planned, published).

Scenarios: A set of possible decisions that allow a workflow user to tweak one or more of the decision inputs and evaluate the affected metrics and downstream data objects (e.g., outputs). A scenario may be automatically generated using some logic (e.g., a scoring model or optimization) or may be the result of manual user input. A scenario should allow operational users to quickly visualize or understand how changes in the inputs affect the decision(s) and the resulting metric(s) and/or output data objects.

Variables: Any type of data passed between widgets, including a data object set, a data object, and primitive values (int, string, dates, etc.). Variables may be used to share state among widgets (e.g., enable communication between linked widgets). Variables may also be used to connect widgets to workflow logic applied in the workflow application; workflow logic can define default values for variables and variables can be the input values to workflow logic (e.g., for functions which accept/require inputs). Variables may be configured to serve as externally available parameters.

Session: A "snapshot" or "save state" that captures the entire state of one or more workflow applications (and any corresponding data, such as data objects) for a workflow user at a singular point in time, including variable states, edits to data objects, the outputs of widgets (e.g., calculated metrics), session metadata, a draft (via a draft ID that points to the draft), and so forth. A session may, or may not, be specific to a particular workflow application. A new session may be started when a workflow user launches a workflow application. Sessions may be auto-saved and/or user saved, and a workflow user may be able to retrieve old sessions. For instance, a user may create thirty new data objects in a session and those changes may be saved as part of a change/edit log, and later on, the user may retrieve that session with the thirty new data objects. In some implementations, all sessions associated with a workflow user may be saved for historical analysis purposes, but the workflow user may only be able to see and access a subset of their saved sessions. In some implementations, usage analytics or performance metrics may be anonymously associated with sessions (e.g., how many times did a user open a particular interactive workflow application, how many times did an interactive workflow application get committed, how many times did a user overwrite function-generated outputs, and so forth).

Action: An ontological concept (e.g., defined in the ontology) that provides a wrapper for one or more edits that can be made by a workflow user to data objects of a particular data object type or to the relationships between data objects of particular data object types (e.g., for data object types and relationships defined in the ontology). Actions may have validation logic, and edits in a single action may be atomic commits. Actions can be a wrapper for a combination of one or more of the following edits: create/delete data objects (e.g. of a particular data object type), create/delete links, and the edit of a property of a data object. An action may accept parameters as an input (e.g., set a property value to be the current property value+[number]). For instance, the ontology may specify permissible actions associated with a "Car" data object type, such as an action that edits a "paint color" property for data objects of the "Car" data object type. Thus, a workflow application may be configured to allow a user to perform that action to change the "paint color" property of a "Car A" data object via the workflow. Some examples of actions would include: (1) a Change Role action that changes the "Role" property of an "Employee" data object; (2) a Delay action that changes the "Departure Time" and "Arrival Time" properties of a "Taxi" data object; and (3) a Swap action that takes in two different "Taxi" data objects, and switches the values for a "Taxi Number" property between the two data objects.

Draft: A set of uncommitted actions. A draft may be application-agnostic and a single draft may extend across multiple different workflow applications. Actions made by a workflow user of a workflow application can either be staged in a draft and applied only with a second confirmation or applied automatically once the action is taken. Across all workflow applications, there may be consistent UX to indicate actions staged in a draft, and Actions that have been committed.

Function: User-defined code that captures workflow logic and imports it into a workflow application for execution (e.g., by a widget). Some examples of functions would include: (1) a Derived object set function for loading data objects; (2) a Derived property function for displaying metadata on data objects; (3) a Generator function for writing/editing data objects; and (4) a Metric function for evaluating a list of data objects.

Metric: A measurement evaluated from an input of a data object or a set of data objects, which is output by application logic. The definition of a metric will indicate the data object types for the inputs and outputs of the metric.

Constraint: A validation check for the occurrence of an un-allowed operation in a decision. A constraint may be implemented using application logic that validates the output data objects of a decision. A constraint may be "hard" (e.g., cannot be overridden) or it may be override-able (e.g., by a workflow user of the workflow application). For example, a change made during a workflow, which results in a taxi being deployed outside the geographical region it is permitted to operate in, would violate a "Taxi Outside Boundaries" constraint.

Override: Data that captures the circumvention of a constraint violation flag. An override may include the state/version of the constraint that was overridden and the state/version of the constraint input data objects that were overridden. It may also include the reason for the override.

Tweak: A change made to something existing as a result of application logic. For example, a tweak can be made to an input data object and result in a modified/edited version of the data object (e.g., a tweaked data object).

Figures—Object-Centric Application-Building System

FIG. 1 is a block diagram of an object-centric application-building system 100. The object-centric application-building system 100 may include an ontology 110, a builder software 150, a custom database 152, an application creator 154, a workflow application 160, entity data 162, and a workflow user 164.

The ontology 110 may be a data model for the storage of data in one or more databases (e.g., entity data 162). The ontology 110 may serve as a model for how real-world objects are to be represented through data. The ontology 110 may be user-defined, computer-defined, or some combination of the two. The ontology 110 may include definitions for data object types, link types/definitions associated with data object types (e.g., how data object types may be related to one another), definitions for decisions, and definitions for scenarios, and so forth. The ontology 110 may also provide a permissions model for stored data and it may include permissions associated with any of the definitions in the ontology (e.g., permissions for data object types, actions, and so forth).

For a data object type, the ontology 110 may define the properties, actions, and relationships associated with that data object type. The properties of a data object type may be used to define the properties of data objects of that type, which can be used to capture the attributes of the real-world objects corresponding to those data objects. The actions of a data object type may be used to define the actions for data objects of that type, which may be executed for those data objects (e.g., a defined change that is made to the value of a property of a data object), such as through the workflow application 160. The relationships of a data object type may be used to define how that data object type relates to other data object types within the ontology 110, which may be used to define the relationships that a data object of that particular type has with other data objects. In some cases, the relationships between data object types may be captured by the types/definitions of links. The ontology 110 may also define hierarchical relationships among data object types.

Figure 3:
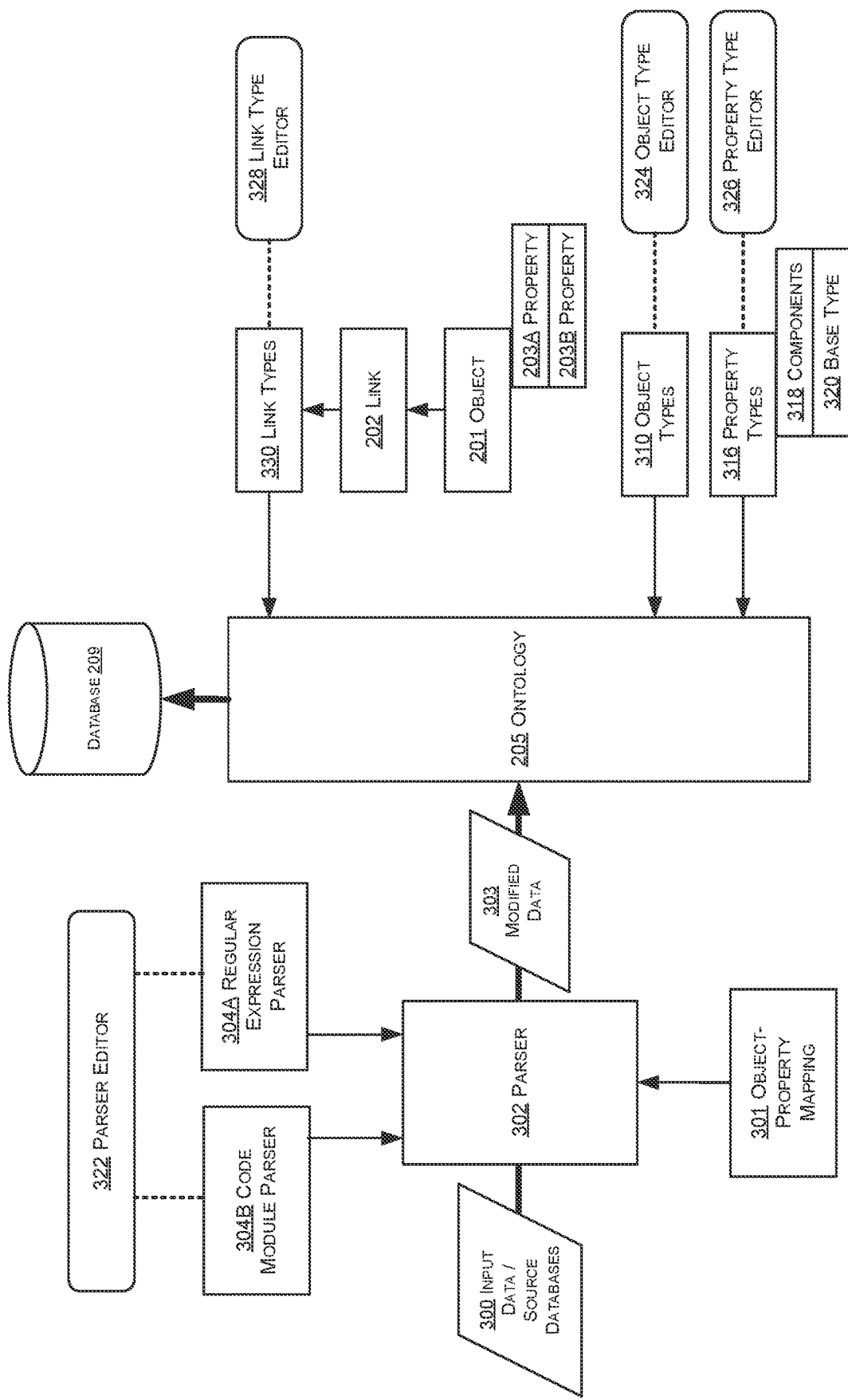
FIG. 3 illustrates a block diagram illustrating exemplary components and data that may be used in identifying and storing data according to an ontology, according to various embodiments of the present disclosure.
Figure 4:
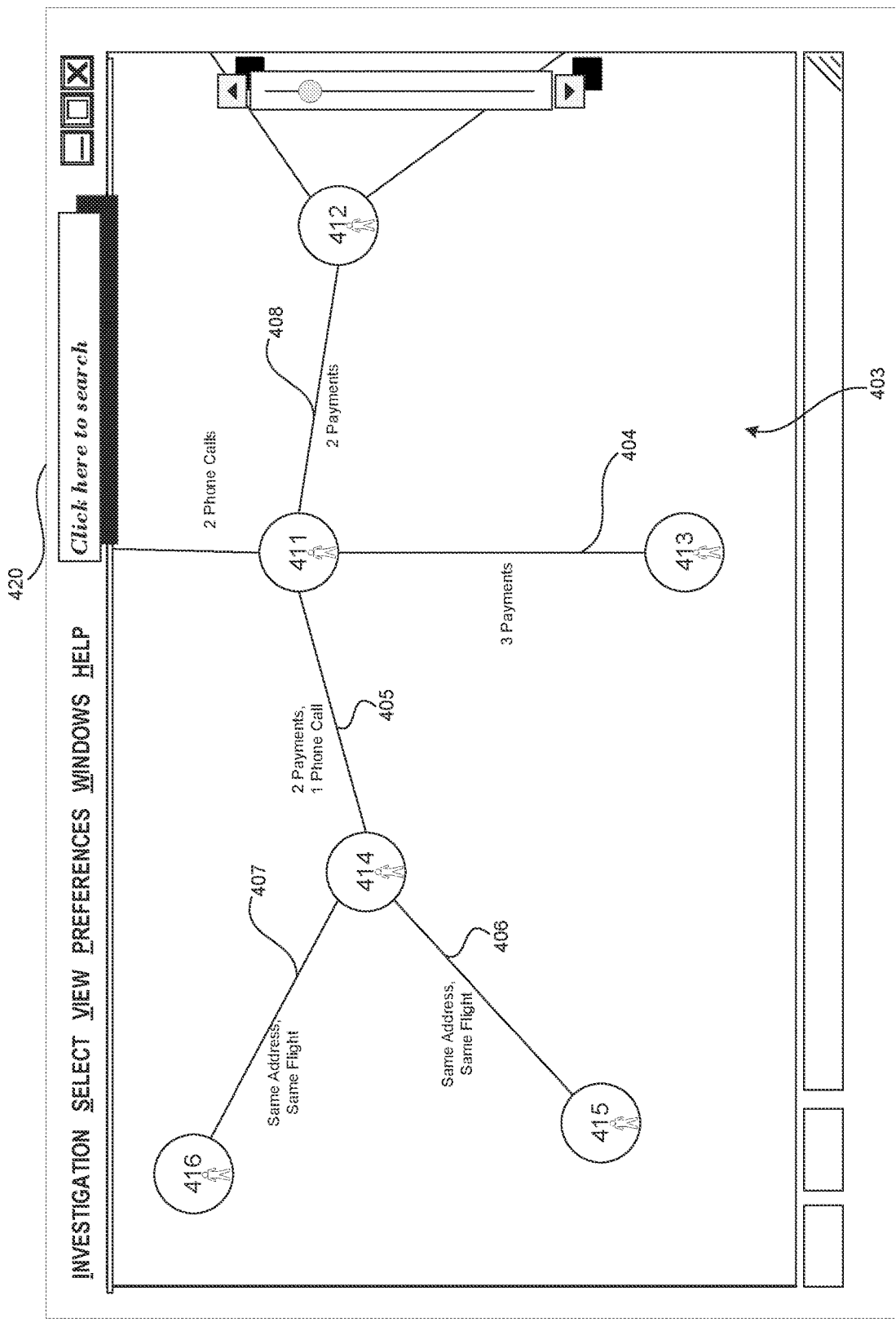
FIG. 4 illustrates an example user interface showing a graph representation of relationships between data objects, according to various embodiments of the present disclosure.

The properties/actions/relationships associated with the data object types, the links (e.g., relationships) between data object types, the decision definitions, and the scenario definitions may be visualized and/or editable using a graphical user interface (GUI), such as the GUI of one or more ontology editor(s) 112. In some implementations, the ontology editor(s) 122 may include the object type editor 324, property type editor 326, and/or link type editor 328 that are shown in FIG. 3. There may be a separate GUI or application (not shown) for visualizing and/or editing the actual data objects and their relationships (e.g., within the entity data 162), which may have a user interface resembling the one shown in FIG. 4.

An application creator 154 may be able to use the builder software 150 to design, configure, and build the workflow application 160 for executing a workflow. It should be understood that, in practice, the builder software 150 may be used to design, configure, and build numerous workflow applications used to execute various workflows. However, for the purposes of facilitating understanding and for simplicity, a single workflow application 160 is shown. The builder software 150 may come with numerous out-of-the-box widgets and functions that the application creator 154 can select from in order to tailor the workflow application 160 to a particular workflow. However, in some implementations, the builder software 150 may also be able to support the use of custom widgets in the workflow application 160 and those custom widgets may be shared and re-usable across different workflow applications. For example, the builder software 150 may be in communication with a custom database 152 that contains various custom widgets that have been created (such as by the application creator 154), and the builder software 150 may be able to plug-in and implement those custom widgets within the workflow application 160.

In some implementations, some workflow logic (e.g., for the workflow) can be separated from the workflow application 160. In some cases, workflow logic may be integrated through frontend configuration of the workflow application 160 in the builder software 150 (e.g., by configuring a widget to filter for a dynamic set of data objects). In some cases, workflow logic can be written into functions that respond in real-time to user inputs. These functions may be custom written and stored (e.g., within the custom database 152, or another database), and they may be referenced by the workflow application 160 (e.g., in a widget or a decision) in order to execute the workflow. In some cases, the set of functions used by a workflow application 160 and stored separately from the workflow application 160 (and its application logic) may be referred to as a function registry. Using separately stored functions to capture workflow logic may allow the workflow logic to be shared and re-usable, rather than sequestered inside a single workflow application. Furthermore, if the underlying workflow logic is modified or updated, the function (e.g., in custom database 152) can be revised and the workflow application 160 would not have to be changed since it can reference the updated function. In some implementations, components of the workflow application 160 (e.g., widgets) can be configured to execute defined functions (e.g., by the application creator 154), but the workflow user 164 may have to select inputs that are appropriate to the types of inputs that function is configured to receive.

The builder software 150 may leverage the ontology 110 and its data model in order to have an advance understanding of the structure of the data that the workflow application 160 will be processing; this data model can be referenced during the designing, configuring, and building of the workflow application 160 in order to simplify the entire process for the application creator 154. For example, the builder software 150 may allow the application creator 154 to configure the inputs and outputs (e.g., data object sets of particular data object types) of widgets in the workflow application 160, and the builder software 150 may reference the ontology 110 in order to prevent mismatches (e.g., ensure that the output of a first widget is properly used as the input of a second widget). For instance, when configuring widgets, the builder software 150 may only show variables (e.g., referencing data objects) to the application creator 154 that are valid variables, since there may be a finite set of variable types (e.g., input variables, output variables, filter variables, and so forth) and variables may be one of these enumerated types.

A workflow user 164 may be able to use the workflow application 160 to perform the workflow on the entity data 162, and the workflow application 160 may also leverage the ontology and its data model during execution of a workflow. In particular, the workflow application 160 may reference the ontology 110 in order to make sense of the structure of the data in the entity data 162. The workflow application 160 can then operate on data in familiar terms and benefit from the definitions in the ontology 110. The user interface of the workflow application 160 may also be configured to provide the workflow user 164 ontology-driven insights on the data (e.g., a workflow user 164 of the workflow application 160 may be able to view displayed overviews of data objects and their properties). Thus, it is important that the entity data 162 corresponds to the ontology 110 used by the workflow application 160. For instance, the entity data 162 should contain data objects that fit the data object types defined in the ontology 110 and links between data objects that fit the link types/definitions in the ontology 110. In some cases, the entity data 162 may be structured in advance based on the ontology 110.

Thus, the ontology 110 may be integral to both the builder software 150 (for building that specific workflow application 160) and that specific workflow application 160 (for executing a workflow). Using the builder software 150 to create a different workflow application (e.g., for a workflow in a different context) may require the use of a different ontology.

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
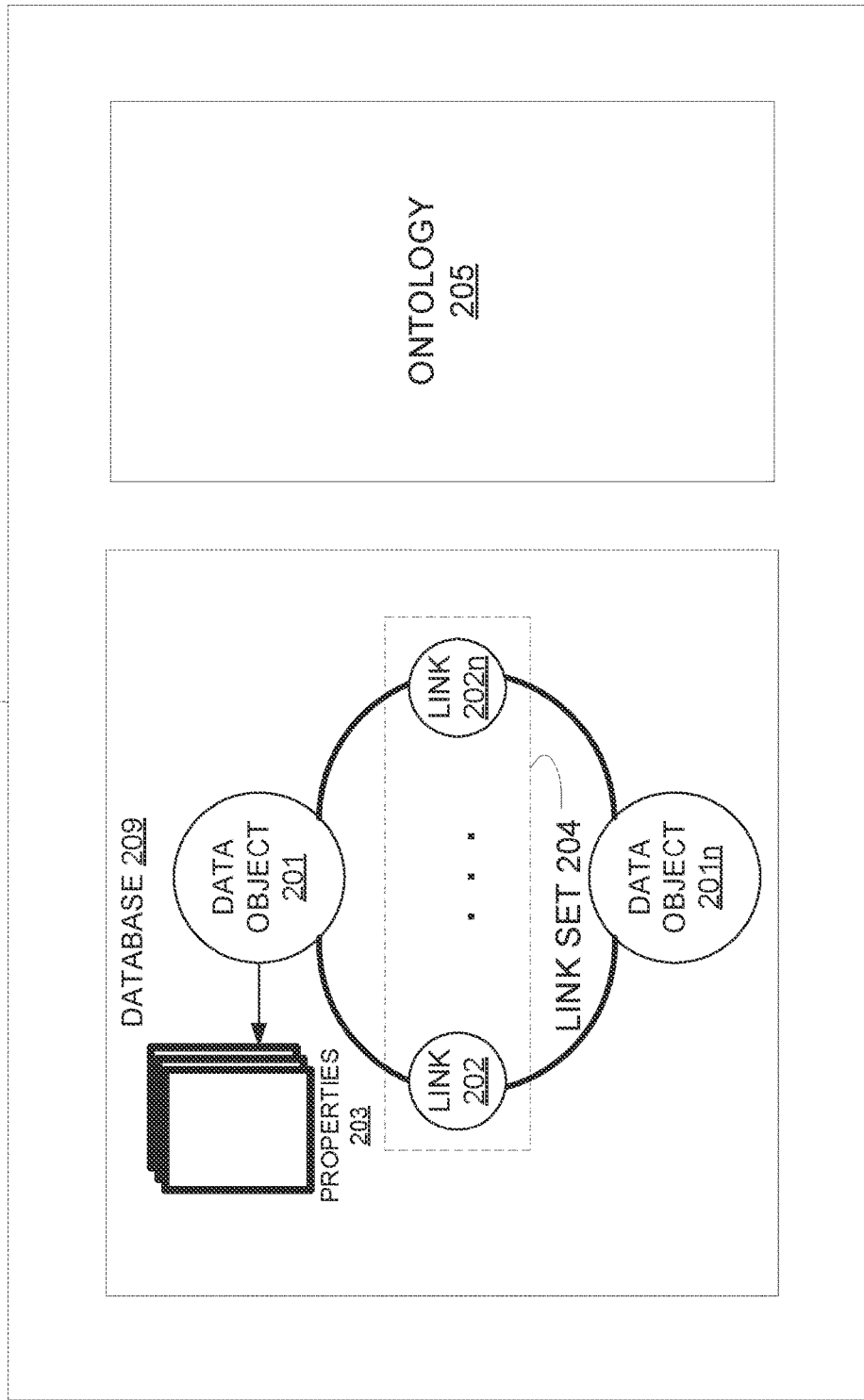
FIG. 2 illustrates an object-centric conceptual data model, according to various embodiments of the present disclosure.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205.

The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

The properties, objects, and the links (e.g. relationships) between the objects can be visualized using a graphical user interface (GUI). For example, FIG. 4 displays a user interface showing a graph representation 403 of relationships (including relationships or links 404, 405, 406, 407, 408) between the data objects (including data objects 411, 412, 413, 414, 415, 416) that are represented as nodes in the example of FIG. 4. In this embodiment, the data objects are person objects. In this example, the person nodes (associated with person data objects) may have relationships to other person nodes, for example, through payment objects. For example, relationship 404 is based on a payment associated with the individuals indicated in person data objects 411 and 413. The link 404 represents these shared payments (for example, the individual associated with data object 411 may have paid the individual associated with data object 413 on three occasions). These relationships may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the data objects within entity data 162 may be searched using a search interface 420 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Example User Interfaces for an Object-Centric Builder Software

FIGS. 5-9 illustrate example user interfaces associated with an object-centric builder software, according to various embodiments of the present disclosure.

Figure 5:
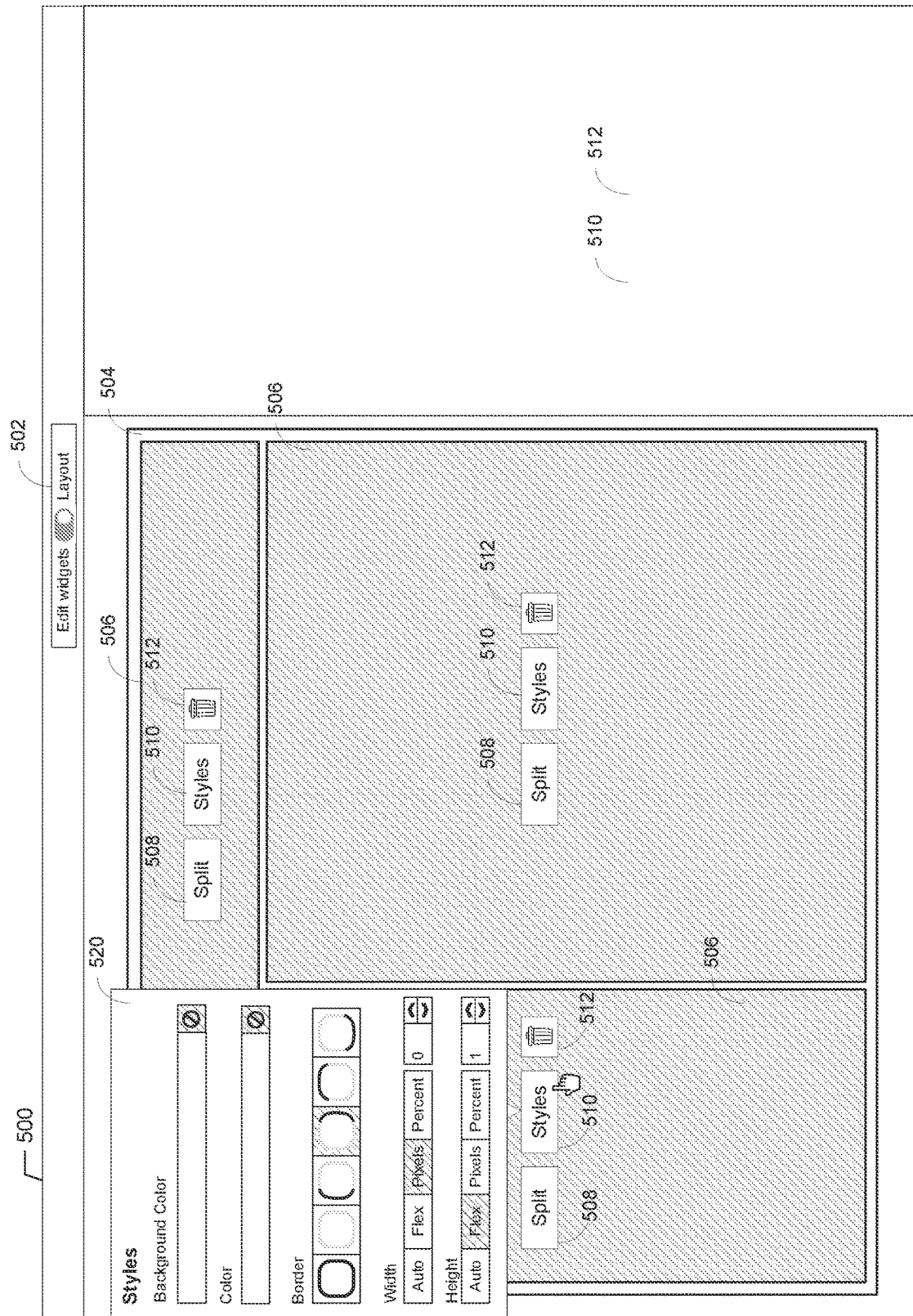
FIG. 5 illustrates an example user interface of an object-centric builder software for editing the layout of a workflow application, according to various embodiments of the present disclosure.

FIG. 5, in particular, illustrates an example user interface 500 of an object-centric builder software for editing the layout of a workflow application by an application creator.

The user interface 500 of the object-centric builder software may display a preview user interface 504 of the workflow application that is to be generated by the object-centric builder software. The preview user interface 504 may serve as a "what you see is what you get" (WYSIWYG) feature that shows a resemblance of the final appearance of the workflow application (e.g., in its stand-alone form), through which edits to the workflow application can be made by the application creator. The builder software can then update the preview user interface 504 in real-time to reflect any edits made to the workflow application, such that the application creator can quickly visualize how those edits would be manifested in the stand-alone workflow application.

The user interface 500 of the object-centric builder software may allow for switching between editing and configuring either the layout or the widgets shown in the user interface of the workflow application. For instance, in some implementations, there may be a toggle 502 that allows the application creator to switch between editing the layout or the widgets of the workflow application in the preview user interface 504.

In some implementations, the layout may include containers that divide up the user interface of the workflow application and constrain the arrangements, positions, and dimensions of the various widgets in the workflow application. Editing the layout may allow for configuration of the containers and editing the widgets may allow for adding and positioning widgets within the existing containers.

For example, as shown in the example user interface 500 shown in FIG. 5, while editing the layout of the workflow application, the preview user interface 504 may display one or more containers 506. Each of the containers 506 may be presented as a self-contained portion of the preview user interface 504.

Within each container 506 may be a set of options that can be selected by the application creator to configure that specific container 506. For instance, each container 506 may include a button 508 to split that container (e.g., to horizontally and/or vertically split that container into two or more child containers that would occupy the space of the parent container), a button 510 to configure the style of the container (e.g., change the visual properties of the container), and a button 512 to delete that container.

To illustrate an example implementation of these container configuration options, as shown in the example user interface 500 of FIG. 5, selecting the button 510 to configure the style of the left-most container 506 may result in the display of a menu 520 that can be used by the application creator to configure the visual properties of that left-most container 506 as it would appear in the stand-alone workflow application. Some examples of these visual properties include the background color (e.g., fill color) of the container, the bordering of the container, the color of the container border, and the dimensions (e.g., height and width) of the container. In some implementations, there may be options to auto size or flexibly size the dimensions of the container, as well as options to manually set the dimensions of the container in pixels or as a percent (e.g., of the entire user interface of the workflow application).

Figure 6:
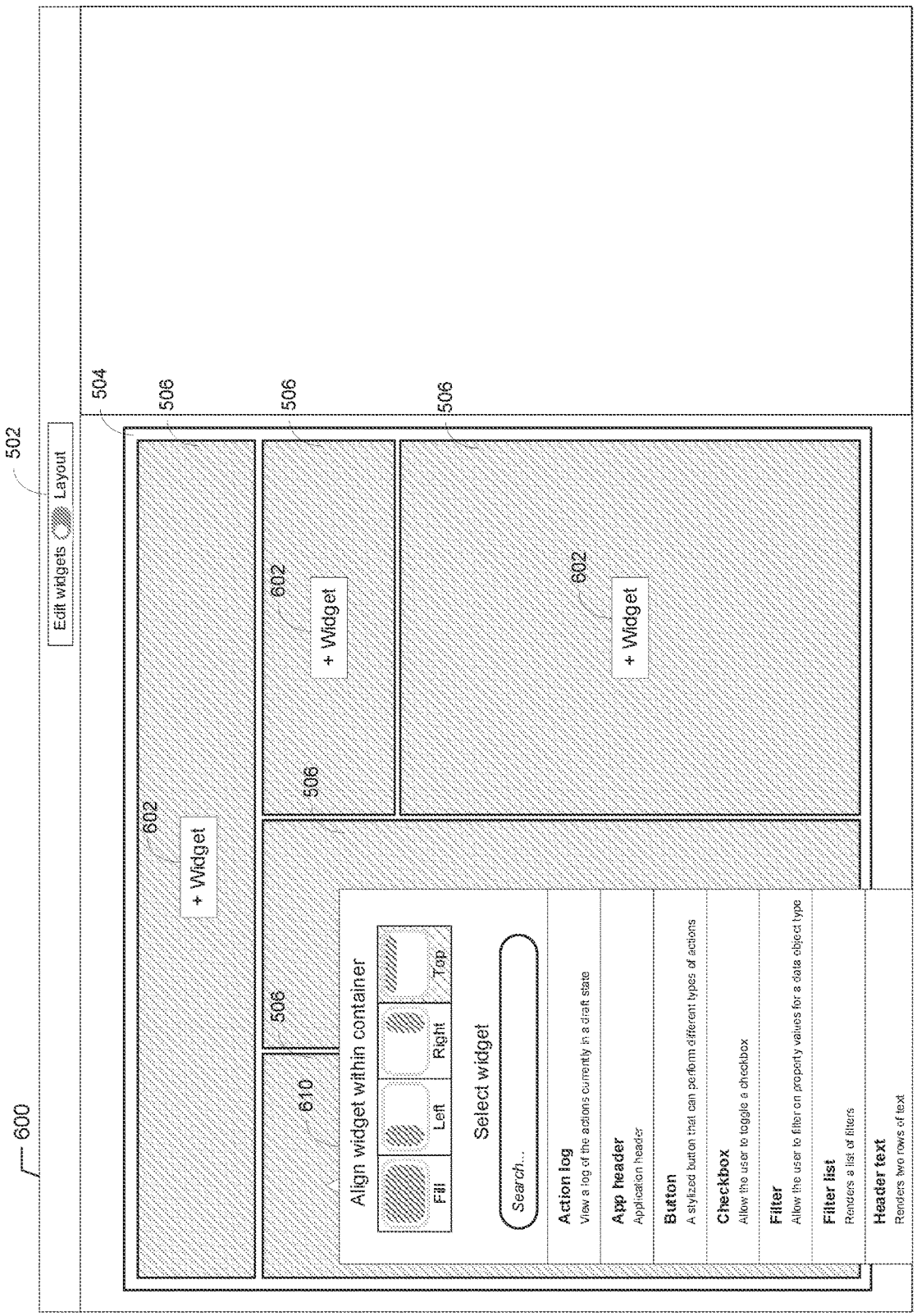
FIG. 6 illustrates an example user interface of an object-centric builder software for adding widgets to the containers of a workflow application, according to various embodiments of the present disclosure.

FIG. 6 illustrates an example user interface 600 of an object-centric builder software for adding widgets to the containers of the workflow application.

In some implementations, once the user interface 600 of the object-centric builder software is set to edit the widget of the workflow application (e.g., by switching the toggle 502), the container configuration options in each of the containers 506 of the preview user interface 504 may be replaced by options for adding and configuring widgets for those containers 506. For instance, each container 506 may have a button 602 for adding a widget to that container.

To illustrate an example implementation of the addition of a widget to a container, as shown in the example user interface 600 of FIG. 6, selecting the button 602 to add a widget to the left-most container 506 may result in the display of a menu 610 that can be used by the application creator to add a widget to that left-most container 506. The menu 610 may provide the ability to select a type of widget to be added to the container 506 (e.g., from among the out-of-the-box widget templates or any available custom widgets, such as through the custom database 152 shown in FIG. 1). The menu 610 may also provide the ability to configure the position and alignment of the widget (e.g., fill, left, right, top, and so forth) within the container, which enables multiple widgets to be added to the same container and visible at the same time depending on how the widgets are configured.

A widget may be any modular component in a user interface (e.g., a user interface element) of a workflow application, which can be configured and previewed through the builder software, that provides the workflow user of the workflow application the ability to view data (e.g., a data object or set of data objects), interact with data, or perform write-back ("actions") on data. The builder software may provide templates for out-of-the-box, default widgets that can be included in a workflow application. Some examples of simple widgets may include tables, histograms, charts, mini data object views, data object summary cards, filters, inputs, sliders, checkboxes, switches, and tabs. More complex widgets may include search boxes, data object explorers (e.g., for providing top-down analysis), inboxes (e.g., a list of sortable/filterable/prioritized data objects that the workflow user is interested in), map result views, chart result views, group-by tables, and so forth.

In some implementations, the menu 610 may provide a list of various types of widgets (e.g., from among the out-of-the-box widget templates or any available custom widgets) and the application creator may be able to select one of the widget types in the list to add to the container 506. In some implementations, the menu 610 may also include a search field that allows the application creator to search for a particular widget type that is of interest. As shown in the illustrative example of FIG. 6, some of the selectable widget types in the menu 610 include "action log", "app header", "button", "checkbox", "filter", "filter list", "header text", and so forth. This is not meant to be an exhaustive list; there may be many different widget types that are available out-of-the-box, and custom widgets can even be programmed and saved as plug-ins to be implemented into many different workflow applications.

Once the application creator selects one of the widget types to add to the container 506, a widget of that type may be added to the container 506 (e.g., based on a template associated with that widget type) and visible in the preview user interface 504. The widget can then be customized and configured through the builder software, and any visual updates to the widget resulting from those changes can be shown in real-time in the preview user interface 504.

For instance, in an illustrative example, the application creator may add a "filter list" widget type (e.g., via the menu 610) to the left-most container 506. In some implementations, a "filter list" widget may allow the workflow user to filter on property values for a data object type. Accordingly, a "filter list" widget would be displayed in that container 506 of the preview user interface 504, such as in FIG. 7.

With further regard to widget types, many of the available widgets may initially appear similar to user interface elements commonly found in the user interfaces of other applications. However, these widgets may be data object-aware and configured to be used with an object-centric builder software to leverage the ontology in ways that their traditional counterparts do not, such as to provide ontology-driven insights to the workflow user of the generated workflow application.

For instance, a traditional table is a common user interface element used to display information associated with a list of objects. However, the traditional table may be improved upon for use as a widget in a widget group of a workflow application. In addition to displaying information about a set of data objects, table widgets can be configured in numerous different ways to take advantage of the ontology and these implementations may range in complexity.

Lower complexity implementations may include the table widget providing a workflow user the ability to easily view a few key properties of a data object displayed in the table widget through a brief data object overview associated with the data object. For instance, a table widget may present a particular property associated with each data object in a list of data objects (e.g., the taxi numbers for a list of taxis), and the table may also have a small icon next to each of those properties. Selecting the icon next to one of those properties may pull up a quick pop up card, tool tip, or summary view with the key properties of the corresponding data object. In some implementations, a table widget may also be configured to provide a full data object view of a data object listed in the table. For instance, a table widget could list various data objects for geographical regions and selecting one of those geographical regions (e.g., for a particular neighborhood or city) may pull up a full data object view for that geographical region, which may show the number of taxis located in that geographical region, and so forth.

In some implementations, a table widget may be configured to provide a linked data object view of many-to-one relationships. The table widget may allow a user to pull up a data object view of a linked data object when there is only one linked data object (e.g., to the selected data object). For instance, if each and every taxi data object was associated with only one taxi driver data object, then a table displaying a column of taxi data objects may also display another column with the linked taxi driver data object corresponding to each of those taxi data objects. Selecting one of the linked taxi driver data objects may open up a taxi driver data object view.

In some implementations, a table widget may be configured to provide a linked data object view of one-to-many relationships. The table widget may provide a workflow user with the ability to view and explore multiple linked data objects of a data object within the table widget. Alternatively, the application creator may configure the table widget to open up a separate view of the linked data objects of a data object in the table widget when that data object is selected. This ability may be configurable by the application creator. For instance, a taxi data object can be associated with multiple different taxi driver data objects, and a table widget may display a column of taxi data objects. Selecting a taxi data object in the table widget may open up a view of all of the linked taxi driver data objects.

In some implementations, a table widget may be configured to provide a linked data object view with a filter parameter passed. The application creator may be able to configure passing a filter parameter through a data object view while referencing a data object view of a data object in the table widget. For example, an application creator may configure selection of a taxi data object in a table widget to open up a data object view of incident report data objects, while passing a filter parameter that filters the incident reports specifically for the ones associated with the taxi that was selected by the workflow user.

In some implementations, a table widget may be configured to provide data object backed aggregate metrics. Application creators may have the ability to configure data object set aggregations in the table widget and dig into the data objects that make up an aggregate displayed in the table widget. For instance, a table may have a column that shows the sum of fares obtained from each taxi data object in the table widget, and a workflow user may be able to select one of the aggregate numbers and view the list of rides (e.g., individual fares) that comprise that aggregate number.

The inbox may be another example of a type of user interface element that can be configured as a data object-aware widget to be used with an object-centric builder software leveraging the ontology. Like with table widgets, an inbox widget can also be used in a workflow of a workflow application to display information about a set of data objects in a list.

For example, in a data model, customers may be linked to transactions, some of which may be suspicious transactions. For the workflow, a workflow user may be able to mark transactions as suspicious for more senior workflow users to review and confirm as being suspicious. When all the transactions for a customer have been reviewed, the workflow user may be able to decide whether to remove the customer (e.g., the customer is suspicious and linked to many confirmed suspicious transactions). In order to decide if a transaction of a customer is suspicious, it may be desirable to view all the other confirmed suspicious transactions associated with that customer. In this example, an inbox can be used to provide to the workflow user (or the senior workflow user) a list of transactions that are awaiting reviews.

In some implementations, the inbox may include filtering based on properties and linked data object properties. The inbox may provide a workflow user the ability to prioritize tasks based on the results displayed in the inbox. For instance, a workflow user may be reviewing various transactions in the inbox, and the inbox may indicate the customer linked to each of those transactions. A workflow user may be able to select the customer property associated with a transaction listed in the inbox in order to bring up all the transactions associated with that customer.

In some implementations, the inbox may have a configurable "starting point" that enables a workflow user to choose between multiple data object options for the display of the inbox. For instance, a workflow user may want to look at customers in some scenarios and look at transactions in other scenarios.

In some implementations, the inbox may have linked object traversal within the inbox to provide a workflow user the ability to seamlessly traverse between linked data objects that are required for a single workflow. For instance, the inbox can be used to display all the transactions associated with a customer that has been marked as suspicious. The workflow user can look at each transaction and take action (e.g., mark individual transactions as suspicious). However, the workflow user may also be able to roll up the view of the inbox to the customer level in order to mark the customer as confirmed suspicious.

In some implementations, the inbox may have data object backed aggregate metrics, which provides a workflow user the ability to configure data object set aggregations in the table and sort data objects based on the aggregate displayed in the table. For instance, the workflow user may be able to sort customers in descending order based on the number of suspicious transactions associated with those customers.

Figure 7:
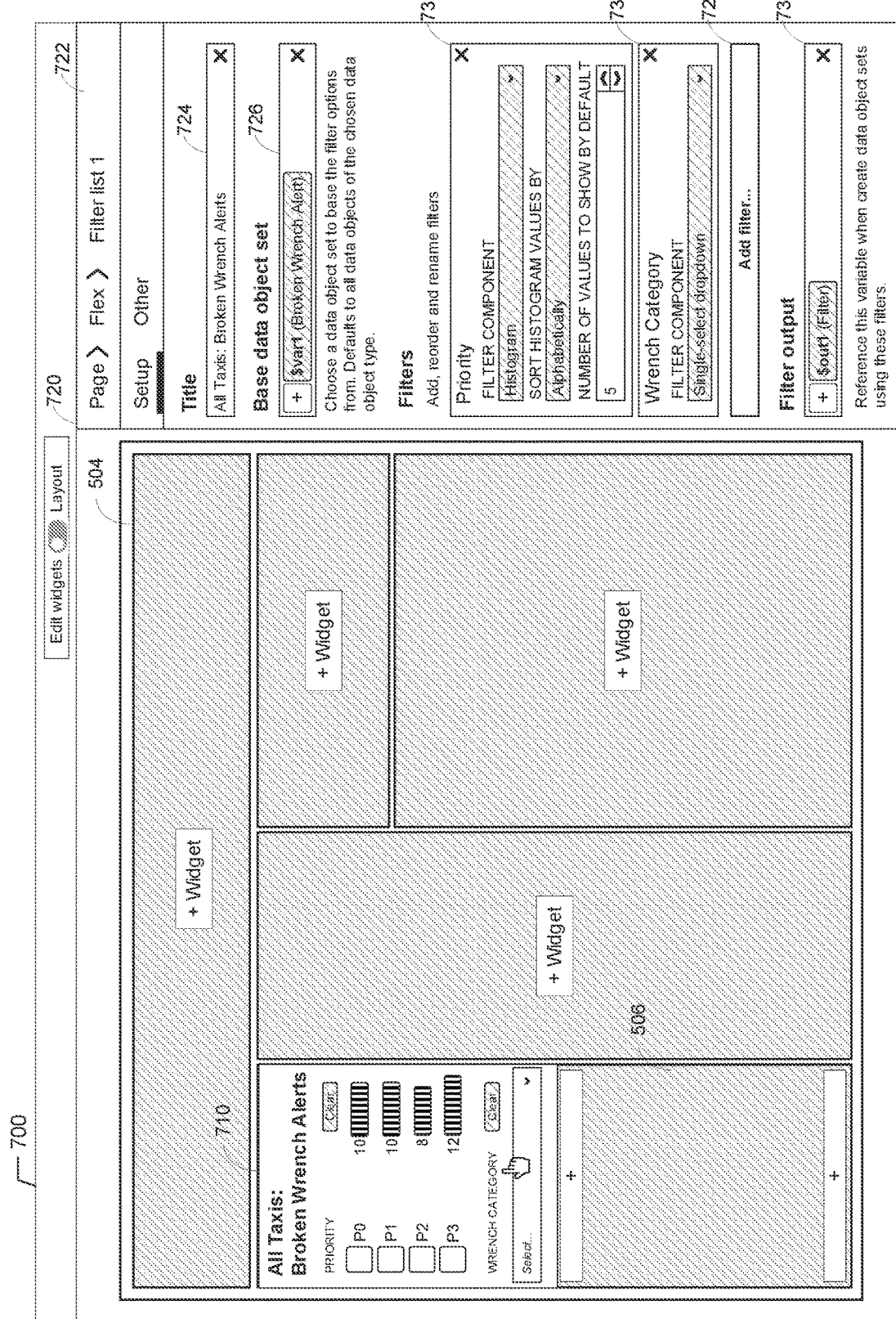
FIG. 7 illustrates an example user interface of an object-centric builder software for customizing a widget added to a container of a workflow application, according to various embodiments of the present disclosure.

FIG. 7 illustrates an example user interface 700 of an object-centric builder software for customizing a widget added to a container of the workflow application.

In the illustrative example of FIG. 7, a "filter list" widget 710 has been added to the left-most container 506 of the preview user interface 504. The "filter list" widget 710 has been configured to align to the top of the left-most container 506, which leaves empty space in the left-most container 506 for additional widgets to be added below the "filter list" widget 710.

Selecting a widget in the preview user interface 504 may open up various configuration options associated with that widget. For instance, in some implementations, the example user interface 700 may include a settings panel 720 that displays various configuration options and settings associated with a selected widget. Thus, selecting the "filter list" widget 710 in the preview user interface 504 may cause the settings panel 720 to populate with configuration options and settings associated with the "filter list" widget 710, which the application creator can modify in order to setup the "filter list" widget 710.

In some implementations, the settings panel 720 may include a user interface element, such as a breadcrumb 722, which provides a navigational aid and indicates the hierarchy of the selected widget that is being modified via the settings panel 720. For instance, the example breadcrumb 722 shown says "Page>Flex>Filter list 1", which indicates the widget being modified is a "filter list" type. In some implementations, the breadcrumb 722 may further indicate which container the widget belongs to (e.g., "Flex") and which layout or user interface that the container belongs to (e.g., "Page").

The settings panel 720 may allow for modifying the configuration of the selected widget, which may include settings for the title of the widget, descriptions of the widget or descriptions of filters (e.g., applied in the widget), any widget inputs (e.g., input data object set(s) and their associated data object types), and any widget outputs (e.g., output data object set(s) and their associated data object types). Some widgets may have strongly-typed configurations that allow for only certain data object types for the input and/or output, which may restrict the data object sets that can be selected for the input and/or output. Some of the settings may have pre-filled options that can be selected from.

For the "filter list" widget 710 shown in FIG. 7, the settings panel 720 may include a text field 724 to set the title displayed at the top of the widget 710. For instance, entering "All Taxis: Broken Wrench Alerts" into the title text field 724 results in "All Taxis: Broken Wrench Alerts" being displayed at the top of widget 710 in the preview user interface 504.

For the "filter list" widget 710 shown in FIG. 7, the settings panel 720 may also include a combo box 726 for selecting the input data object set. The words in parentheses may indicate the type (e.g., data object type) of the selected input. Within the combo box 726, the application creator may also be able to choose a particular data object type and be presented with all the available data object sets of that chosen data object type for selection as an input. For a "filter list" widget, the input data object set may be used to base the filter options from (e.g., filtering on the properties that are associated with the data objects and data object type of the input data object set).

In the illustrative example of FIG. 7, the data object set of "$var1" is specified as the input within the combo box 726. The "$var1" data object set may be a set of data objects of the "Broken Wrench Alert" type, which may be a data object type that is defined in the ontology. In this example, the "Broken Wrench Alert" data object type may be defined in the ontology has having certain properties associated with it, such as priority and wrench category (e.g., alert category). Thus, each "Broken Wrench Alert" may have a priority and wrench category associated with it (e.g., this alert may be of X priority and Y category).

For the "filter list" widget 710 shown in FIG. 7, the settings panel 720 may include a button 728 for adding, naming, and re-ordering one or more filters. In a "filter list" widget, each filter may be configured to filter out any data objects that do not meet the criteria specified in the filter. Thus, in some cases, filters can be applied independently of one another and in any sequence. These filters may filter on properties associated with the data objects in the input data object set, which means their configuration may change depending on the selected input data object set. For instance, a set of "taxi" data objects would have different properties to filter on in comparison to a set of "Broken Wrench Alert" data objects.

The settings panel 720 of FIG. 7 shows two filters, a "Priority" filter 730 and a "Wrench Category" filter 732, that have been added for the "filter list" widget 710. The "Priority" filter 730 has been configured to provide checkboxes for the various values of the priority property that the "Broken Wrench Alert" data objects can have (e.g., P0, P1, P2, and P3 as shown in the "filter list" widget 710), and a workflow user may be able to check one or more of those boxes to filter on "Broken Wrench Alert" data objects that have those priority values. The "Priority" filter 730 has also been configured to show a histogram and the number of data objects in each of the checkbox categories (e.g., the number of data objects having each priority value). The "Wrench Category" filter 732 has been configured to provide a single-select dropdown menu containing the various values of the wrench category property that the "Broken Wrench Alert" data objects can have, and a workflow user may be able to check one or more of those boxes to filter on "Broken Wrench Alert" data objects that have those wrench category values.

Finally, for the "filter list" widget 710 shown in FIG. 7, the settings panel 720 may also include a combo box 734 for selecting and defining the variable that is attached to the output of the "filter list" widget 710. In this case, the output of the "filter list" widget 710 is a filter (as indicated in the parentheses) and the "$out1" variable has been attached to it. Thus, the "$out1" variable may be used to reference the filter on the input data object set that results in a subset of the input data objects that meets all the filter criteria. This variable can be selected when configuring the input data object set for another widget, which would allow the output from this "filter list" widget 710 to be used as the input for the other widget. In this manner, data can be passed between widgets and widgets may be chained together to create a widget group.

It should be noted that widget outputs do not have to be a filters and they may be of any type (e.g., data object type), which will be indicated in the parentheses following the variable name. For instance, in some implementations, the output of a "filter list" widget may be the output data object set that is the subset of the input data objects that meet all the applied filter criteria. Thus, once all the filters of the "filter list" widget 710 (e.g., filters 730 and 732) have been applied to the input data object set to obtain a subset of input data objects that meets all the filter criteria (e.g., the output data object set), a variable can be attached to this output data object set and used to reference this output data object set (e.g., by another widget). This variable would then be selectable as the input data object set for another widget, which would allow the output data object set from this "filter list" widget 710 to be used as the input for the other widget.

Figure 8:
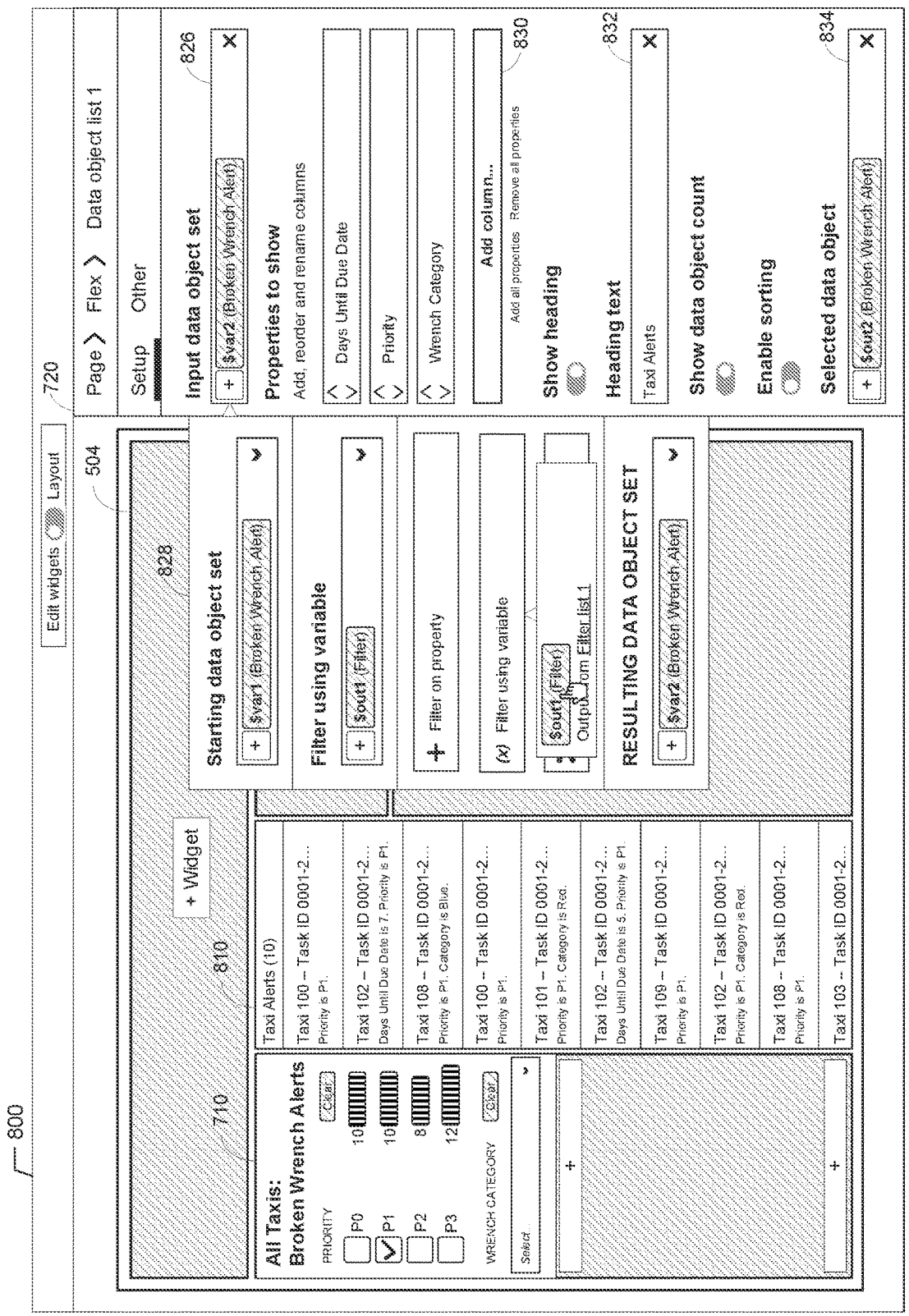
FIG. 8 illustrates an example user interface of an object-centric builder software for customizing a widget added to a container of a workflow application, according to various embodiments of the present disclosure.

An example of passing data between widgets using variables is illustrated in FIG. 8, in which an additional widget has been added that uses the output from the "filter list" widget 710. FIG. 8 illustrates an example user interface 800 of an object-centric builder software for customizing a widget added to a container of the workflow application.

In the illustrative example of FIG. 8, a "data object list" widget 810 has been added to a container next to the container with the "filter list" widget 710 (e.g., through the steps described in connection with FIG. 6). Both widgets can be seen in the preview user interface 504. The "data object list" widget 810 may be a widget that is useful for displaying a list of the data objects that are provided to it as an input, as well as displaying some of the properties associated with each of the data objects in the list. Selecting this "data object list" widget 810 in the preview user interface 504 may open up various configuration options associated with that widget. For instance, in some implementations, the example user interface 800 may include a settings panel 720 that displays various configuration options and settings associated with a selected widget, and selecting the "data object list" widget 810 in the preview user interface 504 may cause the settings panel 720 to populate with configuration options and settings associated with the "data object list" widget 810.

For the "data object list" widget 810 shown in FIG. 8, the settings panel 720 may include a combo box 826 for selecting the input data object set. For a "data object list" widget, the input data object set may be the set of data objects that are displayed through the widget (which can be previewed in the preview user interface 504). In this example, the combo box 826 may be associated with the menu 828 that the application creator can use to configure the input data object set.

In some implementations, the menu 828 may enable the application creator to select a starting data object set, an optional one or more filters that can be applied to the starting data object set, and the resulting data object set (e.g., after the filters have been applied to the starting data object set) that will be used by the widget as the input data object set. For instance, in the example of FIG. 8, the starting data object set is "$var1" which consists of a set of "Broken Wrench Alert" data objects. The menu 828 may also provide the option of selecting and defining the variable that is attached to the resulting data object set once all the filters have been applied to the starting data object set. In this case, the variable of "$var2" has been attached to the resulting set of "Broken Wrench Alert" data objects once the "$out1" filter has been applied to the "$var1" starting data object set. Thus, this resulting set of "Broken Wrench Alert" data objects can be used as the input data object set of the "data object list" widget 810 by specifying "$var2" in combo box 826 of the settings panel 720. Accordingly, as shown in the figure, checking the "P1" checkbox of the priority filter in the "filter list" widget 710 results in the ten "Broken Wrench Alert" data objects with that priority value being displayed in the "data object list" widget 810.

For the "data object list" widget 810 shown in FIG. 8, the settings panel 720 may include a button 830 to add columns (e.g., properties of data objects) that are displayed within the list of data objects provided by the widget. Selecting button 830 may allow the application creator to select from among the various properties defined for the data object type associated with the input data object set (e.g., the properties defined for the "Broken Wrench Alert" data object type), and values for those properties (if they exist) will be displayed for each corresponding data object in the list. These columns can be reordered and renamed in the settings panel 720. For instance, in the illustrated example, the application creator has configured the "Days Until Due Date", "Priority" and "Wrench Category" columns (e.g., properties associated with the "Broken Wrench Alert" data object type) to be displayed. As can be seen in the preview user interface 504, the values for those properties for the data objects displayed in the "data object list" widget 810 are shown.

Various filters can be applied to this set of "Broken Wrench Alert" data objects, and the menu 828 provides the application creator several options that include "Filter on property", "Filter using variable", and "Search Around" (not visible in FIG. 8). The "Filter on property" option may allow a filter to be added that filters on the properties associated with the data objects in the starting data object set (e.g., the properties of the "Broken Wrench Alert" data objects in "$var1"). The "Filter using variable" option may allow an existing filter with an attached variable to be added. The "Search Around" option may allow the application creator to browse around and look for any existing data objects of a desired data object type (e.g., look for any existing filters). In some implementations, any applied filters may have to adhere to the typing of the starting data object set, so the application creator may only be presented with, or may only select among, filters for the data object type of the starting data object set (e.g., filters on "Broken Wrench Alert").

In the illustrated example, the application creator has selected the "Filter using variable" option in the menu 828 and is presented with a list of variables attached to existing filters that can be applied. So far this list only includes the variable "$out1", which is indicated to be the filter output generated from "Filter list 1" (e.g., the "filter list" widget 710). Selecting "$out1" will apply the filter output from the "filter list" widget 710 to the selecting starting data object set (e.g., the "Broken Wrench Alert" data objects in "$var1"). In various implementations, there may be a finite set of variable types (e.g., input variables, output variables, filter variables) and the builder software may be aware of both the enumerated type of each variable and the variable type it is looking for. As is the case here, only variables that are valid variables may be displayed to the user, which ensures that configured widgets will work properly once the workflow application is created.

In this manner, the "data object list" widget 810 is configured to display the set of "Broken Wrench Alert" data objects that will be obtained by applying the filters in the "filter list" widget 710 that are selected by the workflow user. This technique can be similarly applied to enable widgets of the workflow application to communicate with one another for any purpose (e.g., to pass data objects between one another, open a widget from another widget, and so forth). Multiple widgets may be linked together to form a widget group, for the specific purpose of enabling the workflow user to execute on the workflow that the workflow application is tailored for.

In some implementations, for the "data object list" widget 810 shown in FIG. 8, the settings panel 720 may also include additional configuration options specific to the widget, such as a text field 832 for setting the heading text to be displayed at the top of the "data object list" widget 810, an option to show the heading, an option to show the data object count (e.g., the total number of data objects displayed in the list), an option for enabling sorting of the data objects in the list, and a combo box 834 for selecting and defining the variable that is attached to the data object in the list that is selected by the workflow user. In this case, the variable of "$out2" has been attached to the selected data object, which enables the selected data object to be passed to, and used by, other widgets by referencing the "$out2" variable.

Figure 9:
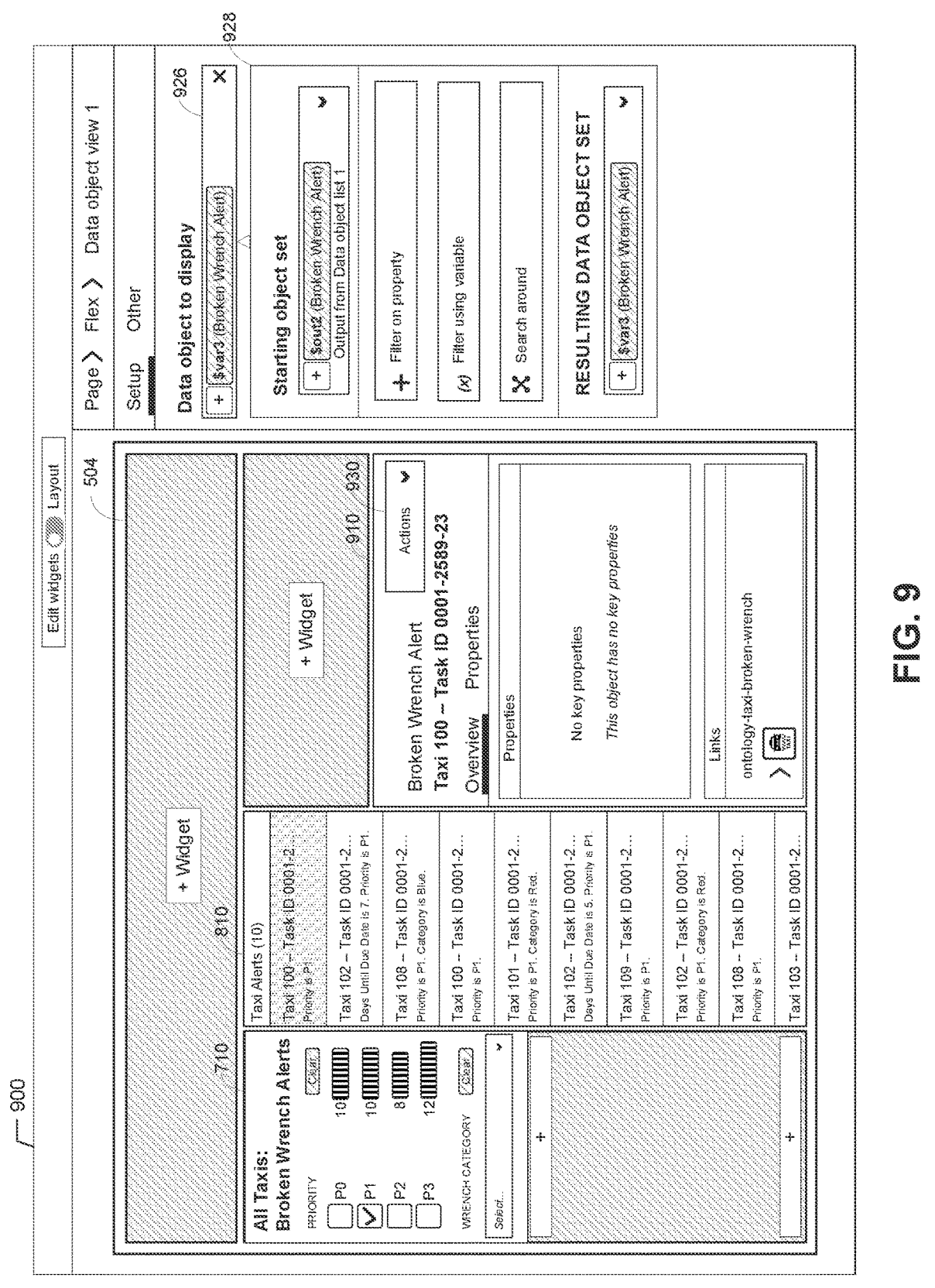

An additional example of passing data between widgets using variables is illustrated in FIG. 9, in which an additional widget has been added that uses the selected data object in the "data object list" widget 810. FIG. 9 illustrates an example user interface 900 of an object-centric builder software for customizing a widget added to a container of the workflow application.

In the illustrative example of FIG. 9, a "data object view" widget 910 has been added to a container next to the container with the "data object list" widget 810 (e.g., through the steps described in connection with FIG. 6). The "data object view" widget 910 may be a widget that is useful for displaying information about a single data object (e.g., its properties, property values, and links/relationships the data object has to other data objects) provided to it as an input.

Selecting this "data object view" widget 910 in the preview user interface 504 may open up various configuration options associated with that widget. For instance, in some implementations, the example user interface 900 may include a settings panel 720 that displays various configuration options and settings associated with a selected widget, and selecting the "data object view" widget 910 in the preview user interface 504 may cause the settings panel 720 to populate with configuration options and settings associated with the "data object view" widget 910.

For the "data object view" widget 910 shown in FIG. 9, the settings panel 720 may include a combo box 926 for selecting the input data object to display information about. The combo box 926 may be associated with the menu 928 that the application creator can use to configure the input data object set. The menu 928 may be similar to the menu 828 described in connection to FIG. 8. In this case, the starting object set has been set as "$out2", the variable for the selected data object in the "data object list" widget 810. No filters are applied on this starting object set, and the resulting data object set of "$var3" (passed to the "data object view" widget 910) should be the same as "$out2." Thus, the "data object view" widget 910 is configured to display detailed information about the selected data object in the "data object list" widget 810.

Accordingly, the three widgets in the preview user interface 504 are linked and form a widget group. The "filter list" widget 710 is configured to provide the workflow user a way to filter an initial set of "Broken Wrench Alert" data objects based on their "Priority" and/or "Wrench Category" properties, and the resulting filtered set of data objects is displayed in the "data object list" widget 810. The workflow user may select one of the data objects in the list of the "data object list" widget 810, and the "data object view" widget 910 is configured to display in-depth information about the selected data object.

In some implementations, the "data object view" widget 910 (or any other suitable widget) may also be configured to allow the workflow user to perform actions (e.g., via the dropdown 930) on the selected data object (e.g., based on actions defined for the data object type in the ontology). An action can be thought of as a defined function (e.g., for creating, modifying, and editing) that can be associated with a particular data object type, which the workflow application can invoke on data objects of that particular data object type. All the actions associated with a particular data object type can be defined within the ontology, such as in the ontology 110 shown in FIG. 1. These actions can be defined based on the templates of default, out-of-the-box actions that are available, such as default actions that create new data objects, actions that edit a property of a data object, and actions that create or modify a link between data objects. Additional, custom actions may also be created through programming code and defined in the ontology. In some implementations, actions may be defined and stored in the ontology using a separate application from the builder software (e.g., the ontology editor(s) 112 shown in FIG. 1) and the application may have an action wizard feature that simplifies the creation and configuration of actions (e.g., by modifying templates for default actions)

As an illustrative example, the ontology may specify that the "Broken Wrench Alert" data object type has a "Priority" property for which the value can be "P0", "P1", "P2", and "P3." Two actions may be defined in the ontology for the "Broken Wrench Alert" data object type: one action to upgrade the "Priority" property value (e.g., change "P0" to "P1") and another action to downgrade the "Priority" property value (e.g., change "P3" to "P2"). Widgets that invoke these actions on one or more "Broken Wrench Alert" data objects could then be added through the builder software. For example, the dropdown 930 may include the actions for upgrading or downgrading the "Priority" property value for the "Broken Wrench Alert" data object displayed in the "data object view" widget 910. Or the application creator could add separate button widgets to one of the containers for performing the actions of upgrading or downgrading the "Priority" property value for a particular "Broken Wrench Alert" data object. The application creator could also configure these actions to be applied to an entire set of "Broken Wrench Alert" data objects, resulting in a mass upgrade or downgrade of the "Priority" property values. In some implementations, during the configuration of widgets, the builder software may be able to auto-populate (e.g., present in a smart way) configuration settings with available and permissible settings based on the ontology. Put another way, the builder software may be able to determine or infer functionality of widgets (e.g., components) based on various conditions, such as available actions, properties, or permissions, with the conditions based on the definitions in the ontology. For instance, during the configuration of a widget that has already been configured to use a set of data objects as an input, the builder software may present available actions that can be performed by the widget based on the actions available to the set of data objects (e.g., the actions for the data object type of the set of data objects, as defined in the ontology). In this previous example, for a widget typically used to interact with data or perform an action (e.g., a button) that is configured to take in one or more "Broken Wrench Alert" data objects, the functionality of the widget may be inferred by the builder software during configuration based on the actions available to "Broken Wrench Alert" data objects (e.g., as defined in the ontology).

Through this approach of adding, configuring, and linking widgets described herein and illustrated in FIGS. 5-9, a workflow application can be designed and generated by the builder software. The resulting workflow application will have an appearance similar to the one shown in the preview user interface 504 of the builder software, and the widgets of the workflow application will be able to interact with the data objects within the entity data based on their configurations set in the builder software.

It should be noted that many of the features associated with the object-centric builder software (and the workflow applications it generates) are not shown in FIGS. 5-9.

One such unillustrated feature is the creation and configuration of decisions (which may alternatively be referred to as "action types"), which can then be implemented in the builder software and its generated workflow applications. A decision may be a set of changes and/or logic applied to one or more data objects in order to capture or reflect a workflow action (e.g., a step in the workflow). For example, a decision may apply a set of logic to one or more data objects. This set of logic may include one or more constraints that are evaluated for different situations, which may result in a set of actions or changes being applied to the particular situation at-hand (e.g., changes such as the generation of one or more data objects, the generation of one or more metrics, the modification of properties of data objects, and so forth).

In various implementations, decisions can be user-defined and stored in the ontology. In some implementations, decisions may be independently defined in the ontology (e.g., separate from the definitions of data object types, etc.), and it must be defined before instantiation (e.g., an instance of the decision is created based on that definition). In some implementations, decisions may be defined and stored in the ontology using a separate application from the builder software (e.g., the ontology editor(s) 112 shown in FIG. 1) and the application may have a decision wizard feature that simplifies the creation and configuration of decisions (e.g., by modifying templates for default decisions). Decisions may also be created through programming code. Creation of a decision may require at least one pre-existing action to be defined. Defined metrics are optional but encouraged.

In some implementations, the creation of a decision through the decision wizard feature may involve selection of a decision type from among the templates of the available default decisions. For instance, a user may decide if a decision will be an "Alerting" decision, a common type of decision with its own distinct template and configuration options. An "Alerting" decision may be a decision used to alert the workflow user and leave it to the workflow user to decide if the alert is right or wrong. For instance, the workflow application may issue an alert to the workflow user for a particular data object (e.g., this "taxi" data object seems to be suspicious). The workflow user may investigate and view information about that data object (e.g., its properties) to make a determination, such as whether that "taxi" data object is indeed suspicious. In some cases, the data object may have a "Status" property that the workflow user can set based on their determination (e.g., with values such as "Not suspicious", "Further investigation required", and so forth). An "Alerting" decision does not require a metric, but a metric can be used when defining the "Alerting" decision (e.g., issue an alert when this metric meets certain conditions). In some implementations, the application used to define the decision may also be used to author the metrics (e.g., write program code for) used in the decisions.

In some implementations, a decision may involve numerous components, such as any number of key performance indicators (KPI, also known as a correlated metric), one or more metrics, one or more input data objects, one or more output data objects, any number of scenarios evaluated, any number of decision support elements, any number of evaluations, any number of constraints, any number of overrides, any number of manual inputs, and decision states. Examples of decision states may include historical (immutable), planned, canceled (when a previously committed-planed is superseded or canceled), and scenario (a state that is connected to "scenarios").

The definition of a decision in the ontology may be a configuration that defines the valid input data object types, the expected output data object types, the metrics that are tracked, the correlated metrics, the decision support elements (e.g., data objects, datasets, links to external elements), the constraints to be checked, and the overrides allowed. A decision may be required to have at least one input data object and one or more output data objects, which are the result of the decision. The decision must be defined before the decision can be instantiated and used in the workflow application.

In some implementations, there may be decision provenance, in which the execution of an instance of the decision by the workflow application may capture (in either materialized or recreate-able form): the version or state of input data objects, all scenarios evaluated with associated data object and metric states, the metrics of the decision, the version or state of output data objects resulting from the decision, decision evaluations, the version or state of decision support elements that are part of the decision definition, and the state or version of KPIs.

Another unillustrated feature associated with the object-centric builder software (and the workflow applications it generates) that is not shown in FIGS. 5-9 may be the creation of scenarios, which can then be implemented in the builder software and its generated workflow applications. A scenario may be thought of a complex decision used for exploring the potential results from a set of actions (e.g., for the evaluation of different possible situations), by allowing the workflow user to tweak or adjust one or more input data objects and evaluate the affected metrics and downstream objects. Scenarios may enable workflow users to perform "what if" style analysis or stage edits for later submission. Thus, whereas a singular action may be applied without an evaluation of the surrounding context, a scenario may encapsulate the actions that are to be performed in many different situations/possibilities. In some embodiments, a scenario may include a set of actions and some metadata. When a workflow user takes an action, there may be two possible outcomes. In the first outcome, the action may be committed directly to the entity data and/or ontology (which will require sufficient permissions). In the second outcome, the action may be created in a scenario, which serves as a branch off the initial base data (e.g., the data affected by the action). Actions may be continually committed to the scenario without affecting the base data. The scenario may be merged into the base data (e.g., to apply the changes of the scenario to the base data). In some cases, merging the scenario into the base data may require sufficient permissions, and a workflow user may have to have a more senior workflow user with the appropriate permissions merge the scenario into the base data.

In various implementations, scenarios can be user-defined and stored in the ontology. In some implementations, scenarios may be independently defined in the ontology (e.g., separate from the definitions of data object types, etc.), and it must be defined before instantiation (e.g., an instance of the scenario is created based on that definition). In some implementations, a scenario may be defined and stored in the ontology using the same application used to create and define decisions, and they may even be created through programming code. In some implementations, scenarios may even be considered as a type of decision.

A scenario may be parented by one or more (e.g., a set of 1-N) decision definitions (this parent decision set may be referred to collectively as {D}) that allow a workflow user to "tweak" or adjust one or more of the input data objects from {D} and evaluate the affected metrics and downstream data objects. More specifically, the workflow user may be able to make changes to input data objects or create new data objects that affect the decision(s)/metrics. An example is a data object being modified to result in two different data objects under two different sets of conditions. Thus, a scenario's scope may be strictly defined by the parent decision set {D}, and every scenario can have one or more decisions as an end product (e.g., no orphaned scenarios). The definition of a scenario in the ontology may be a configuration that defines the valid decision definitions that can be parents, valid "tweaks" (e.g., functions to adjust inputs), and the implicit or explicit input data object types for those tweaks.

In some implementations, there may be scenario provenance, in which the execution of an instance of the scenario by the workflow application may capture all the decision provenance associated with the parent decision set {D} of the scenario, along with the set of tweaks and the resulting data objects from those tweaks.

Figure 10:
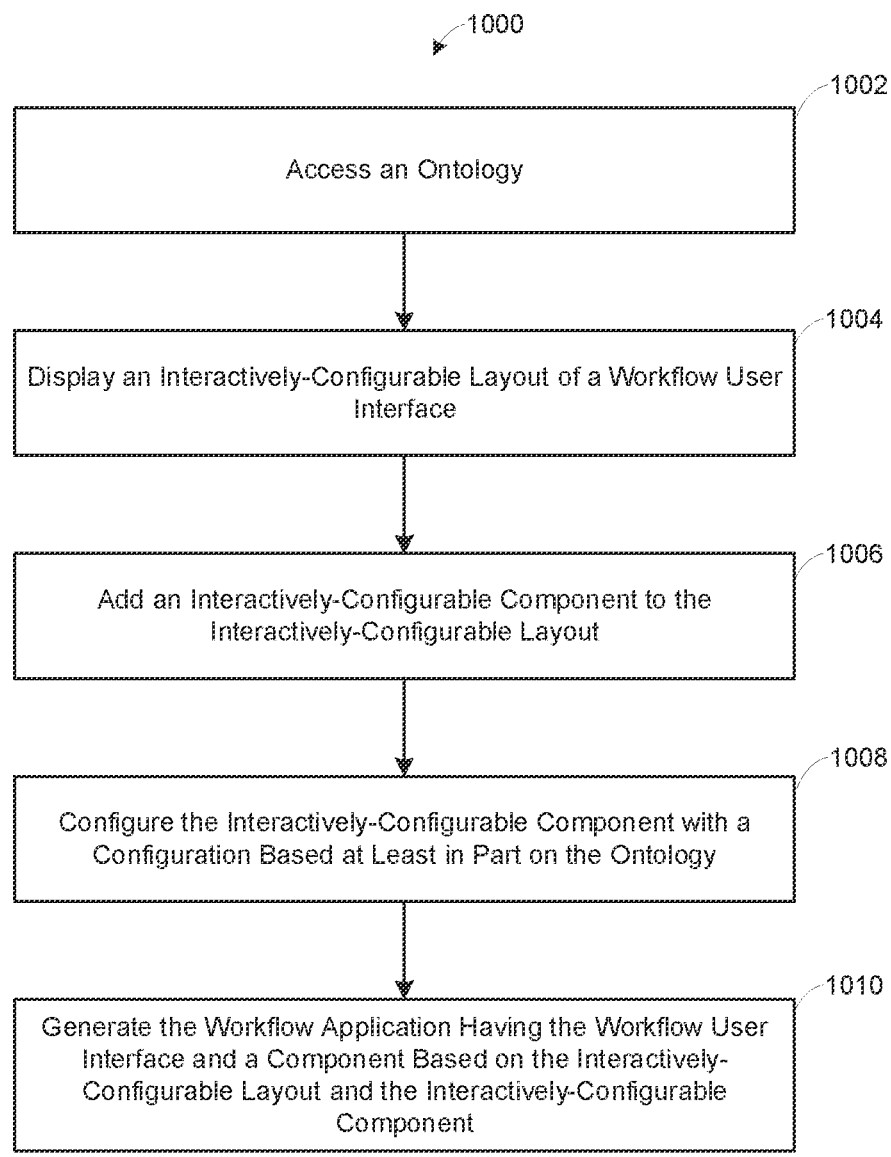
FIG. 10 illustrates a flow chart for a process associated with an object-centric builder software for adding and configuring a widget (e.g., an interactively-configurable component) to a layout for a workflow application, according to various embodiments of the present disclosure.

FIG. 10 illustrates a flow chart for a process 1000 associated with an object-centric builder software for adding and configuring a widget (e.g., an interactively-configurable component) to a layout for a workflow application, according to various embodiments of the present disclosure.

At block 1002, an ontology may be accessed by the object-centric builder software. The ontology may define a set of data object types, relationships among the data object types, properties associated with the data object types, and actions associated with the data object types. The ontology may also include additional definitions used by the object-centric builder software to create a workflow application, such as definitions for decisions, scenarios, metrics, and so forth (e.g., as shown in FIG. 1).

At block 1004, the object-centric builder software may display an interactively-configurable layout of a workflow application's user interface to a user. As used herein, the term "interactively-configurable" may be attached to any aspect of the workflow application (such as a user interface, layout, component, widget, etc.) and used to refer to its counterpart in the builder software that provides a generated preview for that aspect in the workflow application. For instance, this interactively-configurable layout may serve as a template for the actual user interface of a workflow application (which may be referred to as a workflow user interface) that is generated by the builder software. Thus, the user may be able to configure how the user interface of the workflow application will eventually appear and operate by configuring the interactively-configurable layout displayed by the builder software. In some cases, the object-centric builder software may display the interactively-configurable layout through a generated preview of the workflow user interface, such as the preview user interface 504 shown in FIGS. 5-9.

At block 1006, the object-centric builder software may add an interactively-configurable component to the interactively-configurable layout, such as based on a user input from the user to add the interactively-configurable component. The added interactively-configurable component (also referred to herein as a widget) may be selected from a set of default or custom widgets. The interactively-configurable component (e.g., the previewed widget) may serve as a template for the actual component or widget that will be displayed in the workflow user interface of the generated workflow application. Thus, the user may be able to configure how the component will eventually appear and operate in the workflow application by configuring the interactively-configurable component that is displayed in the builder software. An example of adding and configuring an interactively-configurable component to the interactively-configurable layout is shown and discussed in additional detail with regards to FIGS. 5-6.

At block 1008, the object-centric builder software may configure the interactively-configurable component (e.g., widget) with a configuration based at least in part on the ontology. The resulting component in the workflow application will be configured to perform a part of a workflow on a set of data objects, based on the configuration of this interactively-configurable component. Although aspects of the configuration may be user-defined (e.g., through the builder software), aspects of the configuration may also be constrained by the definitions in the ontology for data object types, their properties, and actions. For instance, some configurable aspects of a widget (e.g., inputs, outputs, filters) may have type associations and can only be configured using specific data object types in the ontology, and some configurable aspects of a widget may also change based on the specific data object types being used with the widget. For instance, a widget may be configured to take in a set of data objects as inputs and perform an action available to the data object type of the set of data objects (e.g., change the occupancy status of a set of "taxi" data objects). The actions available for the data object type, and thus the actions available to the set of data objects, will be defined in the ontology. Accordingly, the configuration of the widget itself will depend on the definitions in the ontology because the configuration of the widget may specify a performance of an action that the ontology defines is associated with the data object type.

At block 1010, the object-centric builder software may generate the workflow application having the workflow user interface and the component, based on the interactively-configurable layout and the interactively-configurable component. In other words, a workflow application can be generated with a workflow user interface and the components based on the configuration of their counterparts displayed in the builder software for preview purposes.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 11:
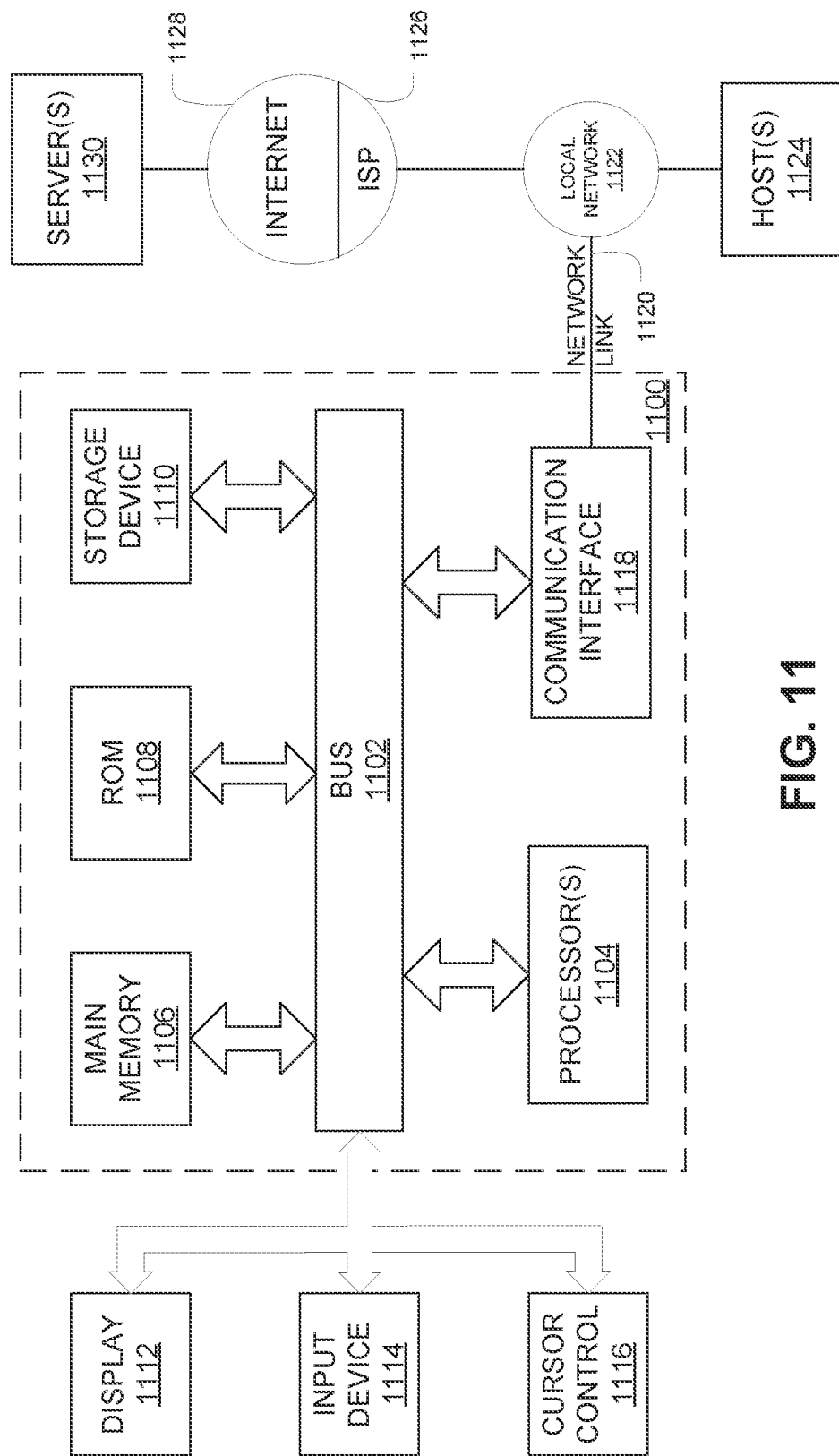
FIG. 11 illustrates a block diagram of a computer system upon which various embodiments may be implemented.

For example, FIG. 11 is a block diagram that illustrates a computer system 1100 upon which various embodiments may be implemented. Computer system 1100 includes a bus 1102 or other communication mechanism for communicating information, and a hardware processor, or multiple processors, 1104 coupled with bus 1102 for processing information. Hardware processor(s) 1104 may be, for example, one or more general purpose microprocessors.

Computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

Computer system 1100 may be coupled via bus 1102 to a display 1112, such as a cathode ray tube (CRT) or LCD display (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1100 may include a user interface module to implement a GUI that may be stored in a mass storage device as computer executable program instructions that are executed by the computing device(s). Computer system 1100 may further, as described below, implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more computer readable program instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicate with a WAN). Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
by one or more computer processors executing program instructions:
displaying an interactively-configurable layout to an application creator user;
adding an interactively-configurable component to the interactively-configurable layout, wherein when configured, the interactively-configurable component allows one or more operations to be performed on a data object having a data object type;
accessing an ontology that defines a data model to determine one or more variables for configuring the interactively-configurable component, wherein said one or more variables comprise inputs or outputs of the interactively-configurable component, wherein said one or more variables adhere with the data object type to prevent a data object type mismatch variables when the one or more operations are performed on the data object;
displaying the one or more variables to the application creator user;
configuring the interactively-configurable component based on a least a selection of the one or more variables by the application creator user; and
generating a workflow application including a component based on the configuration of the interactively-configurable component.

2. The computer-implemented method of claim 1 further comprising:
by the one or more computer processors executing program instructions:
identifying configurable aspects of the interactively-configurable component that can only be configured with data objects having specific data object types;
validating the configurable aspects of the interactively-configurable component to ensure the configurable aspects adhere to the specific data object types to ensure the component will operate properly if executed in the workflow application; and
responsive to determining that the configurable aspects fail validation, preventing configuration of the configurable aspects or flagging the configurable aspects as comprising a prohibited operation.

3. The computer-implemented method of claim 2 wherein the configurable aspects include one or more of an input, an output, or a filter.

4. The computer-implemented method of claim 2 wherein the specific data object types are defined by one or more of a type, property, or action.

5. The computer-implemented method of claim 1 wherein the one or more variables include a filter variable.

6. The computer-implemented method of claim 1 further comprising:
by the one or more computer processors executing program instructions:
determining, based on the data model defined in the ontology, one or more invalid variables associated with the data object type; and
preventing display of the one or more invalid variables to the application creator user.

7. The computer-implemented method of claim 1 further comprising:
by the one or more computer processors executing program instructions:
adding a second interactively-configurable component to the interactively-configurable layout;
configuring an output from the interactively-configurable component as an input of the second interactively-configurable component; and
generating the workflow application including a second component based on the configuration of the second interactively-configurable component.

8. A computing system comprising:
a computer readable storage medium having program instructions embodied therewith; and
one or more processors configured to execute the program instructions to cause the computing system to:
display an interactively-configurable layout to an application creator user;
add an interactively-configurable component to the interactively-configurable layout, wherein when configured, the interactively-configurable component allows one or more operations to be performed on a data object having a data object type;
access an ontology that defines a data model to determine one or more variables for configuring the interactively-configurable component, wherein said one or more variables comprise inputs or outputs of the interactively-configurable component, wherein said one or more variables adhere with the data object type to prevent a data object type mismatch when the one or more operations are performed on the data object;
display the one or more variables to the application creator user;

configure the interactively-configurable component based on a least a selection of the one or more variables by the application creator user; and generate a workflow application including a component based on the configuration of the interactively-configurable component.

9. The computing system of claim 8, wherein the one or more processors are further configured to execute the program instructions to cause the computing system to:

identify configurable aspects of the interactively-configurable component that can only be configured with data objects having specific data object types;

validate the configurable aspects of the interactively-configurable component to ensure the configurable aspects adhere to the specific data object types to ensure the component will operate properly if executed in the workflow application; and responsive to determining that the configurable aspects fail validation, prevent configuration of the configurable aspects or flag the configurable aspects as comprising a prohibited operation.

10. The computing system of claim 9 wherein the configurable aspects include one or more of an input, an output, or a filter.

11. The computing system of claim 9 wherein the specific data object types are defined by one or more of a type, property, or action.

12. The computing system of claim 8 wherein the one or more variables include a filter variable.

13. The computing system of claim 8, wherein the one or more processors are further configured to execute the program instructions to cause the computing system to:

determine, based on the data model defined in the ontology, one or more invalid variables associated with the data object type; and prevent display of the one or more invalid variables to the application creator user.

14. The computing system of claim 8, wherein the one or more processors are further configured to execute the program instructions to cause the computing system to:

add a second interactively-configurable component to the interactively-configurable layout;

configure an output from the interactively-configurable component as an input of the second interactively-configurable component; and generate the workflow application including a second component based on the configuration of the second interactively-configurable component.

15. A non-transitory computer-readable medium including computer-executable instructions that, when executed by a computing system, cause the computing system to perform operations comprising:

displaying an interactively-configurable layout to an application creator user;

adding an interactively-configurable component to the interactively-configurable layout, wherein when configured, the interactively-configurable component allows one or more operations to be performed on a data object having a data object type;

accessing an ontology that defines a data model to determine one or more variables for configuring the interactively-configurable component, wherein said one or more variables comprise inputs or outputs of the interactively-configurable component, wherein said one or more variables adhere with the data object type to prevent a data object type mismatch when the one or more operations are performed on the data object;

displaying the one or more variables to the application creator user;

configuring the interactively-configurable component based on a least a selection of the one or more variables by the application creator user; and generating a workflow application including a component based on the configuration of the interactively-configurable component.

16. The non-transitory computer-readable medium of claim 15, wherein the computer-executable instructions, executed by the computing system, further cause the computing system to perform operations comprising:

identifying configurable aspects of the interactively-configurable component that can only be configured with data objects having specific data object types;

validating the configurable aspects of the interactively-configurable component to ensure the configurable aspects adhere to the specific data object types to ensure the component will operate properly if executed in the workflow application; and responsive to determining that the configurable aspects fail validation, preventing configuration of the configurable aspects or flagging the configurable aspects as comprising a prohibited operation.

17. The non-transitory computer-readable medium of claim 16 wherein the configurable aspects include one or more of an input, an output, or a filter.

18. The non-transitory computer-readable medium of claim 16 wherein the specific data object types are defined by one or more of a type, property, or action.

19. The non-transitory computer-readable medium of claim 15 wherein the one or more variables include one or more of input variables, output variables, or filter variables.

20. The non-transitory computer-readable medium of claim 15, wherein the computer-executable instructions, executed by the computing system, further cause the computing system to perform operations comprising:

determining, based on the data model defined in the ontology, one or more invalid variables associated with the data object type; and preventing display of the one or more invalid variables to the application creator user.

* * * * *